(12) United States Patent
Pyboyina et al.

(10) Patent No.: US 8,492,928 B2
(45) Date of Patent: Jul. 23, 2013

(54) AC-TO-DC CONVERSION

(75) Inventors: Prasad Pyboyina, N. Chelmsford, MA (US); Michael J. Ingemi, Norwood, MA (US)

(73) Assignee: American Power Conversion Corporation, West Kingston, RI (US)

( * ) Notice: Subject to any disclaimer, the term of this patent is extended or adjusted under 35 U.S.C. 154(b) by 344 days.

(21) Appl. No.: 12/727,181

(22) Filed: Mar. 18, 2010

(65) Prior Publication Data
US 2011/0227418 A1    Sep. 22, 2011

(51) Int. Cl.
*H02J 9/00* (2006.01)
*H02J 1/00* (2006.01)

(52) U.S. Cl.
USPC .................. 307/85; 307/64; 307/66; 307/75

(58) Field of Classification Search
USPC .......................................... 307/64–66, 75, 85
See application file for complete search history.

(56) References Cited

U.S. PATENT DOCUMENTS

| | | | |
|---|---|---|---|
| 4,823,247 A * | 4/1989 | Tamoto | 363/16 |
| 5,241,217 A * | 8/1993 | Severinsky | 307/64 |
| 5,654,591 A * | 8/1997 | Mabboux et al. | 307/66 |
| 6,661,678 B2 | 12/2003 | Raddi | |
| 6,819,576 B2 * | 11/2004 | Johnson, Jr. | 363/123 |
| 6,853,097 B2 * | 2/2005 | Matsuda et al. | 307/66 |
| 7,005,759 B2 * | 2/2006 | Ying et al. | 307/64 |
| RE39,060 E * | 4/2006 | Okui et al. | 363/45 |
| 7,042,740 B2 | 5/2006 | Morimoto | |
| 7,402,921 B2 * | 7/2008 | Ingemi et al. | 307/64 |
| 7,705,489 B2 * | 4/2010 | Nielsen et al. | 307/66 |
| 8,143,744 B2 * | 3/2012 | Nielsen et al. | 307/66 |
| 2004/0062059 A1 | 4/2004 | Cheng | |
| 2006/0238941 A1 * | 10/2006 | Ingemi et al. | 361/92 |
| 2008/0061628 A1 * | 3/2008 | Nielsen et al. | 307/66 |
| 2008/0143187 A1 * | 6/2008 | Hoekstra et al. | 307/66 |
| 2009/0237963 A1 | 9/2009 | Prasad et al. | |
| 2010/0054002 A1 * | 3/2010 | Lu et al. | 363/37 |

OTHER PUBLICATIONS

Xu, David M., Yang, C., Kong, J.H., Qian, Zhaoming, "Quasi Soft-Switching Partly Decoupled Three-Phase PFC With Approximate Unity Power Factor", IEEE, Institute of Power Electronics, 1998, pp. 953-957, 0-7803-4340-9/98, Zhejiang University, Hang Zhou, P.R.C.
International Search Report and Written Opinion for PCT/US2011/029053, mailed Oct. 12, 2011.

* cited by examiner

*Primary Examiner* — Adi Amrany
(74) *Attorney, Agent, or Firm* — Gilman Clark Hunter & Messina LLC

(57) ABSTRACT

A front-end converter in an uninterruptible power supply system is described. In an exemplary design, a front-end converter includes a boost circuit having first and second inputs, positive, negative, and neutral output nodes, an inductor, AC inputs, a battery, and first and second devices. The boost circuit is configured to provide a positive capacitor voltage between the positive and neutral nodes and to provide a negative capacitor voltage between the negative and neutral nodes. The first device selectively couples the inductor to a first AC input or a positive port of the battery and the second device selectively couples a negative port of the battery to the second input. The inductor is coupled to the first input and is shared between an online mode of the converter and an on-battery mode of the converter. The battery is coupled through the inductor to the first input during the on-battery mode.

16 Claims, 19 Drawing Sheets

AC-TO-DC CONVERSION

BACKGROUND

Companies and individuals rely on having a consistent supply of power to electronic devices more than ever before. Without power, companies may be unable to manufacture goods, or to operate at all, such as if the company is in the business of supplying information over the Internet. Without power, businesses and individuals may be completely incapacitated regarding critical activities, such as designing products, making goods, providing services, and transacting personal finances (e.g., filing tax returns, and paying bills). Uninterruptible power supplies (UPSs) are often used to provide backup power in case of a power outage. UPSs are commonly used on computing equipment to guard against data being lost due to a power outage before the data are saved. UPSs used with computing equipment also help to guard against a loss in service by providers of information over the Internet, such as by servers, e.g., hosting web pages.

Online UPS systems typically contain a boost stage power factor correction (PFC) front-end converter 502 and an inverter stage rear end 504 as shown in FIG. 1 for the UPS system 500. The inputs to the front-end converter are a 60/50 HZ AC supply 506 and Battery DC supply 508. The UPS 500 works in two modes of operation based on the input voltage. When the input AC voltage is within an acceptable range for the boost converter 502 to operate on the AC supply voltage, the UPS 500 works in an online mode. In this mode, the front-end boost converter 502 takes input power from AC supply 506 and converters the voltage to two DC voltages and provides these voltages to two DC busses 510, 512, with a positive DC bus voltage (+DC) and a negative dc bus voltage (−DC), respectively. When the input AC voltage is not available or not within the acceptable range, the UPS works in an on-battery mode. In this mode, the front-end boost converter 502 takes DC input power from the battery 508 and produces positive and negative DC bus voltages and delivers these voltages to the respective busses 510, 512.

A central control system (controller, not shown) in the UPS system 500 monitors the input AC voltage and controls transfers between the two different modes. Traditionally, relays have been used to transfer the front-end boost converter inputs from AC supply to DC supply and vice versa. Recently, Silicone Controlled Rectifiers (SCRs) have been used for this purpose.

Two bulk capacitors 514, 516 are provided between the DC busses 510, 512. The capacitors 514, 516 are part, of the front end converter 502, but shown outside the converter 502 for illustrative purposes. The capacitors 514, 516 provide energy to a load through the inverter 504 during transfers between different modes of the UPS 500 to help ensure transfers without significant voltage drops to the load.

The inverter 504 is a DC-AC converter that takes input from the positive and negative DC bus voltages and produces an AC voltage at the output. The inverter 504 in typical online UPS systems comprises two buck converters that are controlled by pulse width modulation (PWM) controllers to provide a desired sine wave output.

Referring to FIG. 2, with further reference to FIG. 1, a positive buck converter 522 converts DC voltage from the +DC bus 510 to AC voltage during positive half cycles of the output voltage and a negative buck converter 524 converts DC voltage from the −DC bus 512 to AC voltage during negative half cycles of the output voltage. The outputs of both of the buck converters 522, 524 are combined to get a full cycle of AC voltage. In other words, load power is supplied from the +DC bus 510 during positive half cycles of the output (load) voltage and load power is supplied from the −DC bus 512 during negative half cycles of the output voltage.

Power Factor Correction of Online UPS Systems

There are two modes of front-end boost operation in online UPS systems, online mode and on-battery mode.

Online Mode

Referring to FIG. 3, with further reference to FIGS. 1-2, in online mode the front-end converter 502 uses a positive boost converter 526 and a negative boost converter 528. The front-end converter 502 takes input from the AC supply 506 and outputs two DC voltages. The front-end converter 502 works as a PFC converter while it is working from AC input voltage. The positive boost converter 526 converts positive half cycles of AC input voltage to DC voltage during the positive half cycles of the input voltage. This positive output is given to the +DC bus capacitor 514. The negative boost converter 528 converts negative half cycles of AC input voltage to DC voltage during the negative half cycles of the input voltage. This negative output is given to the −DC bus capacitor 516.

Even though the front-end converter 502 uses two converters 526, 528 to supply power to the two DC buses 510, 512, some of the components (e.g., inductors and current transformers) can be shared so these can be common components for both positive and negative boost converters 526, 528.

FIGS. 4-6 show three circuits 550, 560, and 570 for implementing PFC from an AC supply. The circuits 550, 560, 570 contain positive converters 552, 562, 572 and negative converters 554, 564, 574. The circuit in Black is used in both positive and negative half cycles. These methods are well discussed in the literature. The number of components are not the same for all three topologies. The selection of the topology (circuit) depends on several factors such as power level, control architecture, etc. Of the three circuits 550, 560, 570, the circuit 550 offers several advantages at lower power levels such, as high, efficiency, low cost, simple control implementation and lower part count.

On-Battery Mode

Referring to FIG. 7, with further reference to FIG. 1, in the on-battery mode of operation, the front-end converter 502 takes input power from the battery 508 as the voltage source and delivers power to both the positive and negative DC buses 510, 512. The battery 508 can be connected in different configurations, such as positive non-floating, negative non-floating, or floating. The battery 508 provides positive non-floating voltage when the battery's negative terminal is connected to the neutral and provides negative non-floating voltage when the battery's positive terminal is connected to the neutral. In floating configuration, neither of the battery's terminals is net connected to neutral. The non-floating battery (one terminal of the battery is connected to neutral) simplifies battery voltage sensing and also simplifies the charger control.

Power conversion implementation techniques are different for floating and non-floating batteries in PFC. Known implementations are using boost and buck-boost converters for non-floating battery systems as shown in FIG. 7, and using twin boost converters for floating battery systems as shown in FIG. 9.

Boost and Buck-Boost Converters

As discussed above, one DC voltage from the battery 508 is used to derive two DC output voltages with different polarities. A boost converter 580 is used to boost the battery voltage to the DC bus voltage with the same polarity as the battery 508. The boost converter operation is discussed in above in online mode of operation. A buck-boost converter 590 may be used to derive a DC voltage from the battery 508 with a polarity opposite that of the battery 508.

Referring to FIG. 8, the buck-boost converter 590 includes a buck portion 592 and a boost portion 594. The buck portion 592 includes a switch 596 and an inductor 598, and, the boost portion 594 includes the inductor 598, and a diode 600. When the switch 596 is ON (closed), current flowing through the inductor 598 increases and stores energy. When the switch 596 is OFF (open), the stored energy in the inductor 598 is transferred to the capacitor 516. Thus, while the switch 598 is ON the current path is through the battery 508, the switch 596, and the inductor 598, and while the switch 596 is OFF the current path is through the inductor 598, the capacitor 516, and the diode 600. For a battery with a voltage between 120 VDC and 240 VDC and an output bus voltage of +400 volts, the switch 596 should be rated at 1200V as the switch 596 switches the battery voltage plus the +DC bus voltage. Also, the diode 600 should be rated at 1200V.

The total front-end converter 502 uses two converters (boost 580 and buck-boost 590) to transfer energy from the battery 508 to the positive and negative DC buses 510, 512. The converters 580, 590 are separate converters and do not share components during on-battery operation. Because the two converters 580, 590 are separate and operate concurrently, for improved efficiency, in on-battery operation, single inductor solutions shown in FIGS. 4 and 5 can not be implemented.

Twin Boost Converters

Another approach to output both positive and negative voltages from a single battery is by using a floating battery and a twin boost converters configuration 610 as shown in FIG. 9. In this configuration, neither of the battery terminals is connected to the neutral, unlike the buck-boost approach. Operation of the twin boost converter is discussed in U.S. Pat. No. 5,654,591.

Three-Phase Applications

Prior three-phase front-end topologies typically have used fully decoupled PFCs, while some have used partially-decoupled PFCs at lower power levels because of a fewer CTs and better utilization of silicon and magnetics. For example, a three-phase, partially-decoupled PFC is discussed in U.S. Pat. No. 7,005,759, in which four inductors are used to implement three-phase front-end converter in an online system. Referring to FIG. 10, which is FIG. 3 in U.S. Pat. No. 7,005, 759, a three-phase front-end converter 620 includes a switch $S_o$ that is open during the online operation so that the PFC can work from input AC through inductors $L_a$, $L_b$, and $L_c$ and diodes $D_1$ to $D_6$. The inductors $L_a$, $L_b$, $L_c$ are boost inductors for the three-phase PFC. A description of PFC operation can be found in "Quasi-Soft-Switching Partly Decoupled Threephase PFC. With Approximate Unity Power Factor" by David M. XU C. Yang J. H. Kong Zhaoming. Qian (IEEE, 1998). During the on-battery operation, the switch $S_o$ is closed and the battery supplies the power to the dc buses. The inductor L is used as boost inductor in the on-battery mode of operation. CTs are not shown but would be disposed between $L_a$ and $D_1$, $L_b$ and $D_2$, $L_c$ and $D_3$, and between the battery and L.

SUMMARY

An example of a front-end converter in an uninterruptible power supply (UPS) system includes: a boost circuit having first and second inputs, a positive output node, a negative output node, and a neutral output node, the boost circuit configured to rectify incoming alternating-current (AC) power to provide a positive voltage across a positive capacitor coupled between the positive node and the neutral node and to provide a negative voltage across a negative capacitor coupled between the negative node and the neutral node; an inductor coupled to the first input of the boost circuit; a first AC input and a neutral AC input together configured to receive alternating-current power; a battery having a negative port and a positive port; a first device coupled, disposed, and configured to selectively couple the inductor to one of the first AC input or the positive port of the battery; and a second device coupled, disposed, and configured to selectively couple the negative port of the battery to the second input of the boost circuit; where the inductor is shared between an online mode of the converter and an on-battery mode of the converter and the battery is coupled through the inductor to the first input of the boost circuit during the on-battery mode.

Implementations of such a front-end converter may include one or more of the following features. The converter further includes a single current transformer coupled in series with the inductor between the first device and the first input of the boost circuit. The boost circuit includes first and second switches, and the converter further includes a single controller coupled to the single current transformer, the positive output node, the negative output node, and the first and second switches, the single controller being configured to couple to an output of an inverter to be coupled to the positive and negative nodes, where the single controller is configured to: cause, during a positive half cycle of a voltage at the output of the inverter, the second switch to close and the first switch to open and close in order to maintain a voltage at the positive output node within a first desired range; and cause, during a negative half cycle of a voltage at the output of the inverter, the first switch to close and the second switch to, open and close in order to maintain a voltage at the negative output node within a second desired range. The converter further includes a single controller coupled to the first and second devices and configured to: cause the first device to couple the inductor to the AC input during the online mode of the converter and to couple the inductor to the positive port of the battery during the on-battery mode of the converter; and cause the second device to couple the negative port of the battery to the neutral node during the online mode of the converter and to couple the negative port of the battery to the second input of the boost circuit during the on-battery mode of the converter.

Additionally or alternatively, implementations of the front-end converter may include one or more of the following features. The boost circuit includes: first and second input diodes, with an anode of the first input diode and a cathode of the second input diode connected to the first input of the boost circuit and an anode of the second input diode connected to the second input of the boost circuit; first and second output diodes; and first and second switches; where an anode of the first output diode is connected to a cathode of the first input diode, a cathode of the second output diode is connected to an anode of the second input diode, the first switch is connected on one end between the first input diode and the first output diode and on another end to a neutral connection, and the second switch is connected on one end between the second output diode and the second input diode and on another end to the neutral connection. The converter further includes: a third device coupled to the anode of the first input diode and a cathode of the first input diode and configured to selectively bypass the first input diode; and a controller coupled to the third device and configured to cause the third device to close to bypass the first input diode during the on-battery mode and to open during the online mode.

Additionally or alternatively, implementations of the front-end converter may include one or more of the following features. The second device is configured to selectively couple the negative port of the battery to one of the second input of the boost circuit or to the negative node. The inductor is a first inductor and the first AC input is configured to couple to a first phase port of a three-phase AC source, the converter further including: a second AC input configured to couple to a second phase port of the three-phase AC source; a third AC input configured to couple to a third phase port of the three-phase AC source; a second inductor coupled between the second device and the second input of the boost circuit, the second device being configured to selectively couple the second inductor to one of the negative port of the battery or to the second AC input; a fourth device; and a third inductor coupled between the fourth device and a third input of the boost circuit, the fourth device being configured to selectively couple the third inductor to the third AC input. The boost circuit includes: first and second input diodes, with an anode of the first input diode and a cathode of the second input diode connected to the first input of the boost circuit and an anode of the second input diode connected to the neutral AC input; third and fourth input diodes, with an, anode of the third input diode and a cathode of the fourth input diode connected to the second input of the boost circuit and an anode of the fourth input diode connected to the neutral AC input; and fifth and sixth input diodes, with an anode of the fifth input diode and a cathode of the sixth input diode connected to the third input of the boost circuit and an anode of the sixth input diode connected to the neutral AC input; the converter further including: a fifth device coupled to an anode of the fourth input diode and a cathode of the fourth input diode and configured to selectively bypass the fourth input diode; and a controller coupled to the fifth device and configured to cause the fifth device to close to bypass the fourth input diode during the on-battery mode and to open during the online mode. The converter further includes a third device coupled to the anode of the first input diode and a cathode of the first input diode and configured to selectively bypass the first input diode, the controller being coupled to the third device and configured to cause the third device to close to bypass the first input diode during the on-battery mode and to open during the online mode. The boost circuit includes: first and second input diodes, with an anode of the first input diode and a cathode of the second input diode connected to the first input of the boost circuit and an anode of the second input diode connected to the neutral AC input; third and fourth input diodes, with an anode of the third input diode and a cathode of the fourth input diode connected to the second input of the boost circuit and an anode of the fourth input diode connected to the neutral AC input; and fifth and sixth input diodes, with an anode of the fifth input diode and a cathode of the sixth input diode connected to the third input of the boost circuit and an anode of the sixth input diode connected to the neutral AC input; the converter further including: a first current transformer coupled between cathodes of the first, third, and fifth input diodes and an anode of a positive output diode of the boost circuit; and a second current transformer coupled between anodes of the second, fourth, and sixth input diodes and a cathode of a negative output diode of the boost circuit. The converter further includes: a positive half cycle battery switch coupled, disposed, and configured to selectively couple the positive port of the battery to the neutral node; a negative half cycle battery switch coupled, disposed, and configured to selectively couple the negative port of the battery to the neutral node; and a controller coupled to the positive and negative half cycle battery switches and configured to cause the positive half cycle switch to be open, isolating the positive port of the battery from the neutral node, and the negative half cycle switch to be closed, coupling the negative port of the battery to the neutral node, during a positive half cycle of an inverter output voltage, and to cause the positive half cycle switch to be closed, coupling the positive port of the battery to the neutral node, and the negative half cycle switch to be open, isolating the negative port of the battery from the neutral node, during a negative half cycle of the inverter output voltage. The first and second devices are relays.

An example of an uninterruptible power supply (UPS) includes: a DC-DC front-end converter including: converter inputs configured to be coupled to an AC power supply; a positive DC front-end output; a negative DC front-end output; and a neutral front-end output; the UPS further including a positive capacitor coupled between the positive DC front-end output and the neutral front-end output; a negative capacitor coupled between the negative DC front-end output and the neutral front-end output; and a DC-AC inverter coupled to the positive DC front-end output, the negative DC front-end output, and the neutral front-end output, and including a positive DC inverter output and a neutral DC inverter output; the DC-DC front-end converter further including: a boost circuit; a battery; and a single inductor coupled between an input of the boost circuit and a device configured to selectively couple the inductor to a positive port of the battery or to a first of the converter inputs.

Implementations of such a UPS may include one or more of the following features. The DC-DC front-end converter is configured to bypass a diode of the converter during an on-battery mode of the converter. The DC-DC front-end converter further includes a single current transformer coupled between the device and the input of the boost circuit. The converter inputs are configured to be coupled to a three-phase AC power source, the single inductor is a single first inductor; the device is a first device, and the input of the boost circuit is a first input of the boost circuit, the DC-DC front-end converter further including: a single second inductor coupled between a second input of the boost circuit and a second device configured to selectively couple the second inductor to a negative port of the battery or to a second of the converter inputs; and a single third inductor coupled between a third input of the boost circuit and a third device configured to selectively couple the third inductor to a third of the converter inputs. The converter further includes fourth and fifth devices configured to bypass first and second input diodes during an on-battery mode of the converter. The converter further includes: a sixth device configured to selectively couple the positive port of the battery to a neutral node of the converter; and a seventh device configured to selectively couple the negative port of the battery to the neutral node of the converter. The converter further includes a controller coupled to the fourth, fifth, sixth, and seventh devices and configured to cause: the fourth and fifth devices to be closed, bypassing the first and second input devices, during the on-battery mode of the converter; the sixth device to be open, isolating the positive port of the battery from the neutral node, and the seventh device to be closed, connecting the negative port of the battery to the neutral node, during a positive half cycle of an output voltage of the inverter; and the sixth device to be closed, connecting the positive port of the battery to the neutral node, and the seventh device to be open, isolating the negative port of the battery from the neutral node, during a negative half cycle of the output voltage of the inverter.

Items and/or techniques described herein may provide one or more of the following capabilities. For example, front-end converters with reduced components may provide lower cost of the total circuit, high efficiency, and simplified control implementation. Lower-rated components may be used in converters, e.g., 600V rated components of a 230V system as opposed to 1200V rated components. Efficiency of converters may be improved. Front-end converters with a single inductor, a single current transformer, and a single controller may be used, reducing a quantity of analog-to-digital conversion channels and reducing cost. Front-end converters may be used that contain no SCRs, yielding improved efficiency, less or no heat sinking, and reduced cost compared to converters with SCRs. Front-end converters may use batteries in floating voltage configurations during online operation, simplifying charger control circuitry. Printed circuit board space used by front-end converters may be reduced and power density increased.

While pairs of items/techniques and corresponding effects have been described, it may be possible for a noted effect to be achieved by means other than those noted, and a noted item/technique may not necessarily yield the noted effect.

DETAILED DESCRIPTION

The disclosure provided herein describes, among other things, techniques, embodied in methods and/or apparatus, for providing front-end, converters, e.g., for UPSs containing front-end AC-DC converters connected to DC-AC inverters. For example, front-end converters with shared components for both online and on-battery operation, and with the battery connected in a floating voltage configuration, are provided. Devices, preferably relays, selectively connect the front-end converter to an AC source during online operation, and connect a battery to the converter during on-battery operation. A single inductor is shared between the online and on-battery modes, coupling either the AC source or the battery to a boost circuit. A three-phase front-end converter uses devices, preferably relays, to connect each input phase to a boost circuit via a single inductor. The single inductor for each of two of the phases is shared between online and on-battery modes. Bypass mechanisms are preferably used to bypass input diodes of the boost circuit during on-battery mode. Further, either a positive or negative port of a battery can be selectively connected to the converter, and the other port to neutral, depending upon a half cycle of an inverter output voltage. Other embodiments are within the scope of the disclosure.

Single-Phase Circuitry

Figure 1:
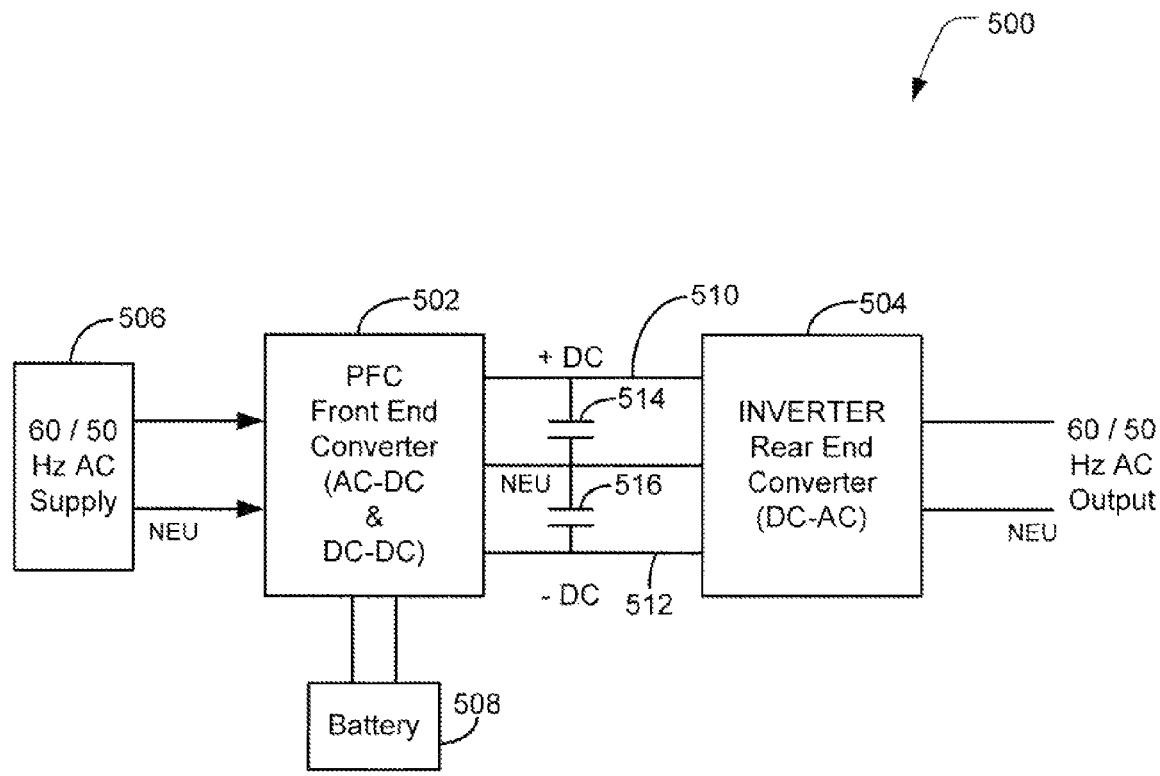
FIG. 1 is a block diagram of an online UPS system.
Figure 2:
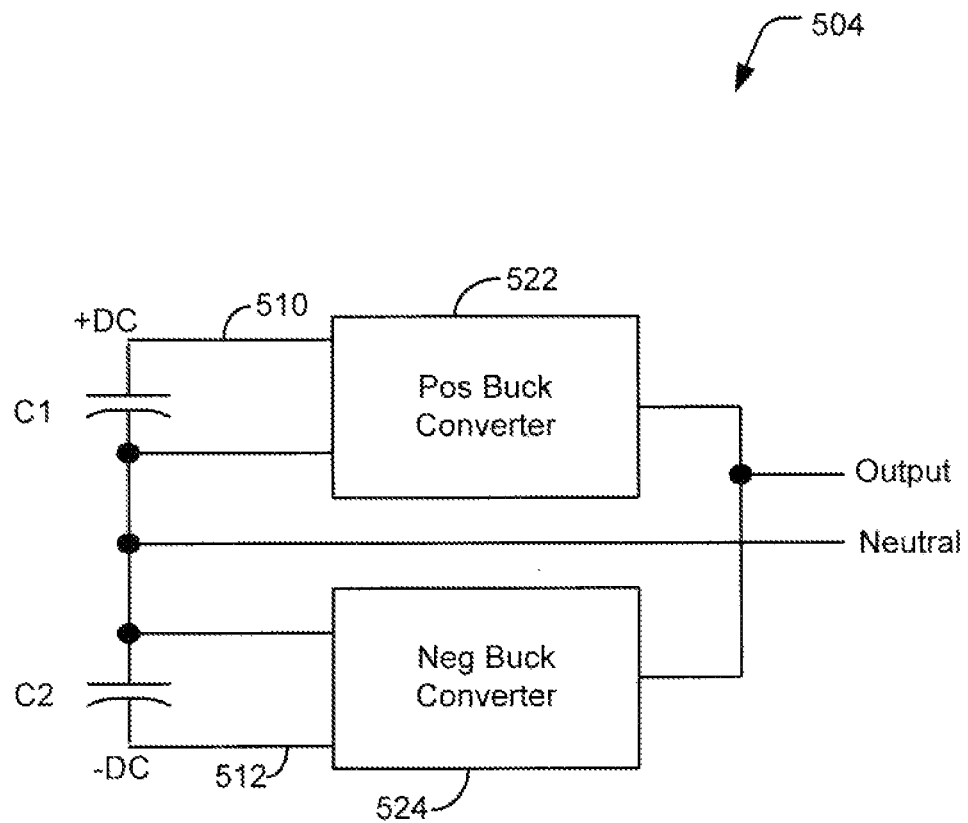
FIG. 2 is a block diagram of an inverter without a transformer in an online UPS system.
Figure 3:
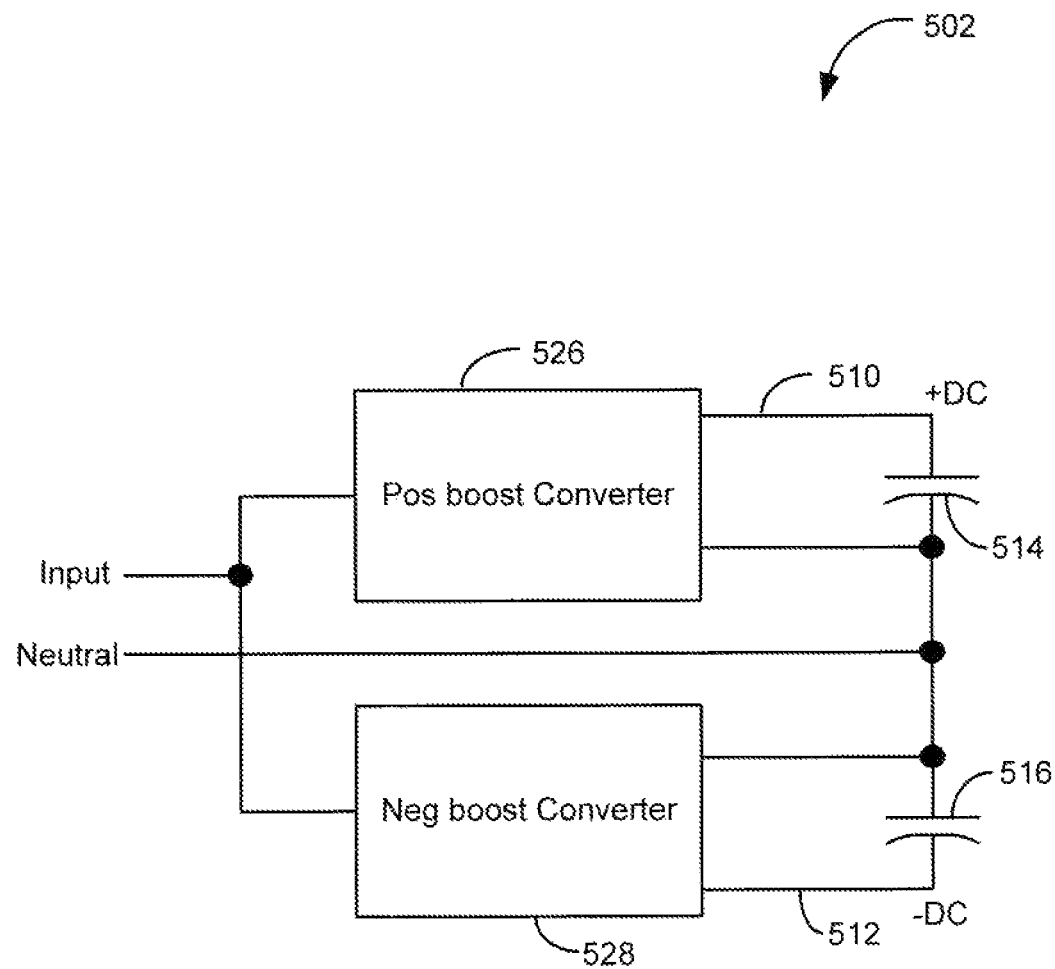
FIG. 3 is a block diagram of a single-phase power factor correction circuit in an online mode.
Figure 4:
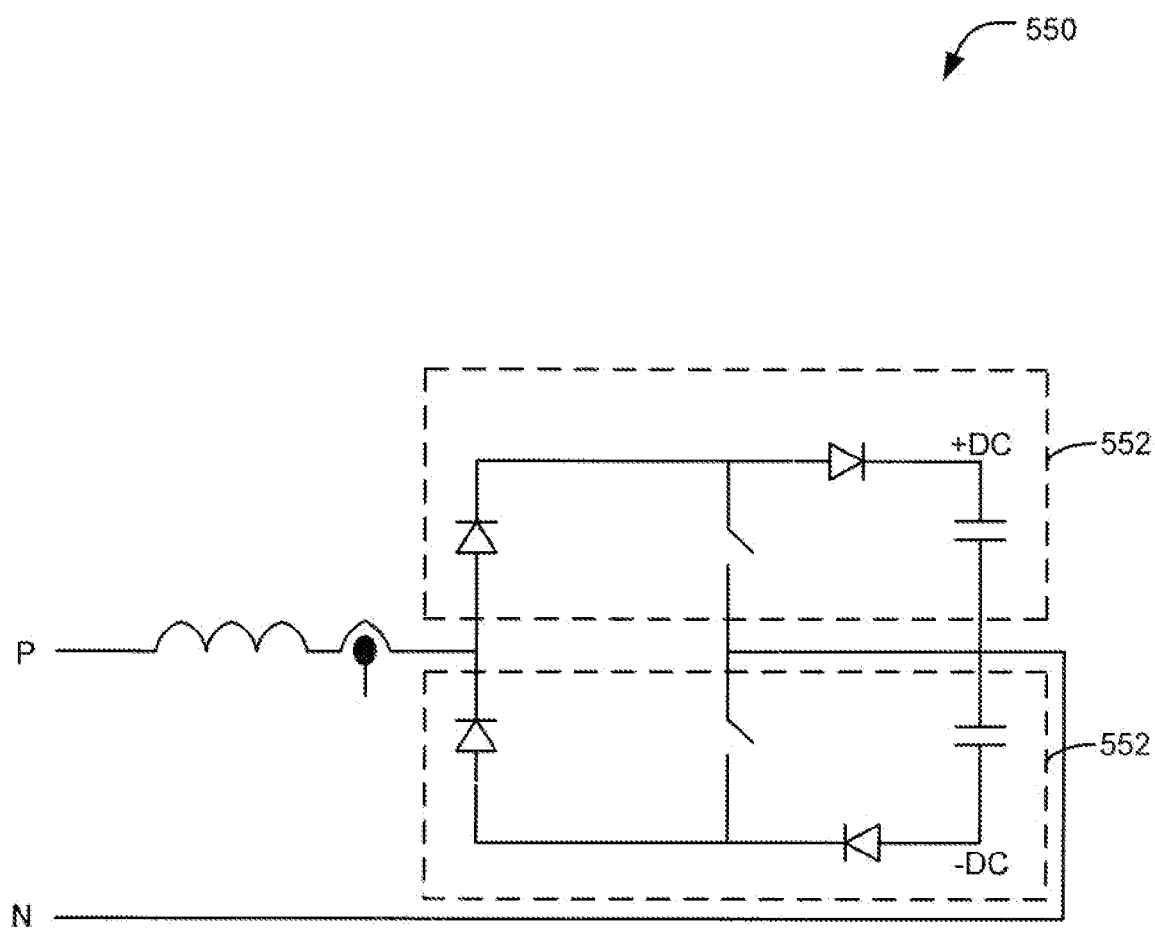
FIGS. 4-6 are circuit diagrams of front-end boost converters for implementing PFC from an AC supply.
Figure 5:
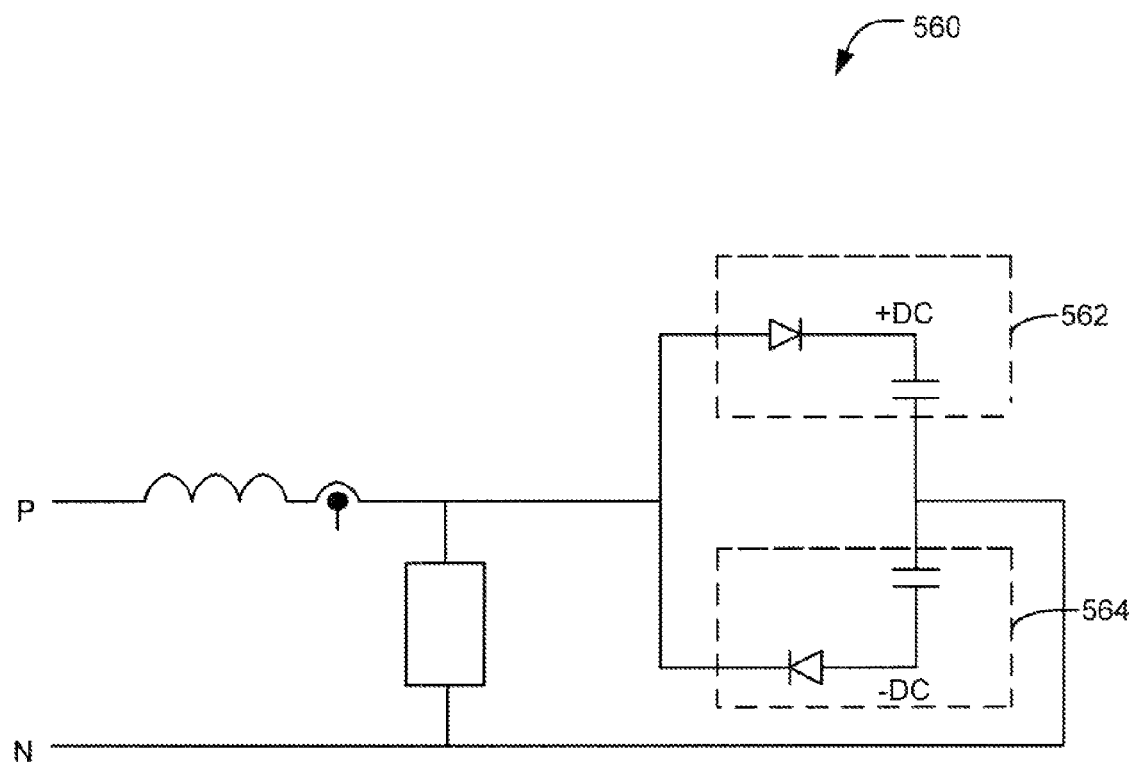
Figure 6:
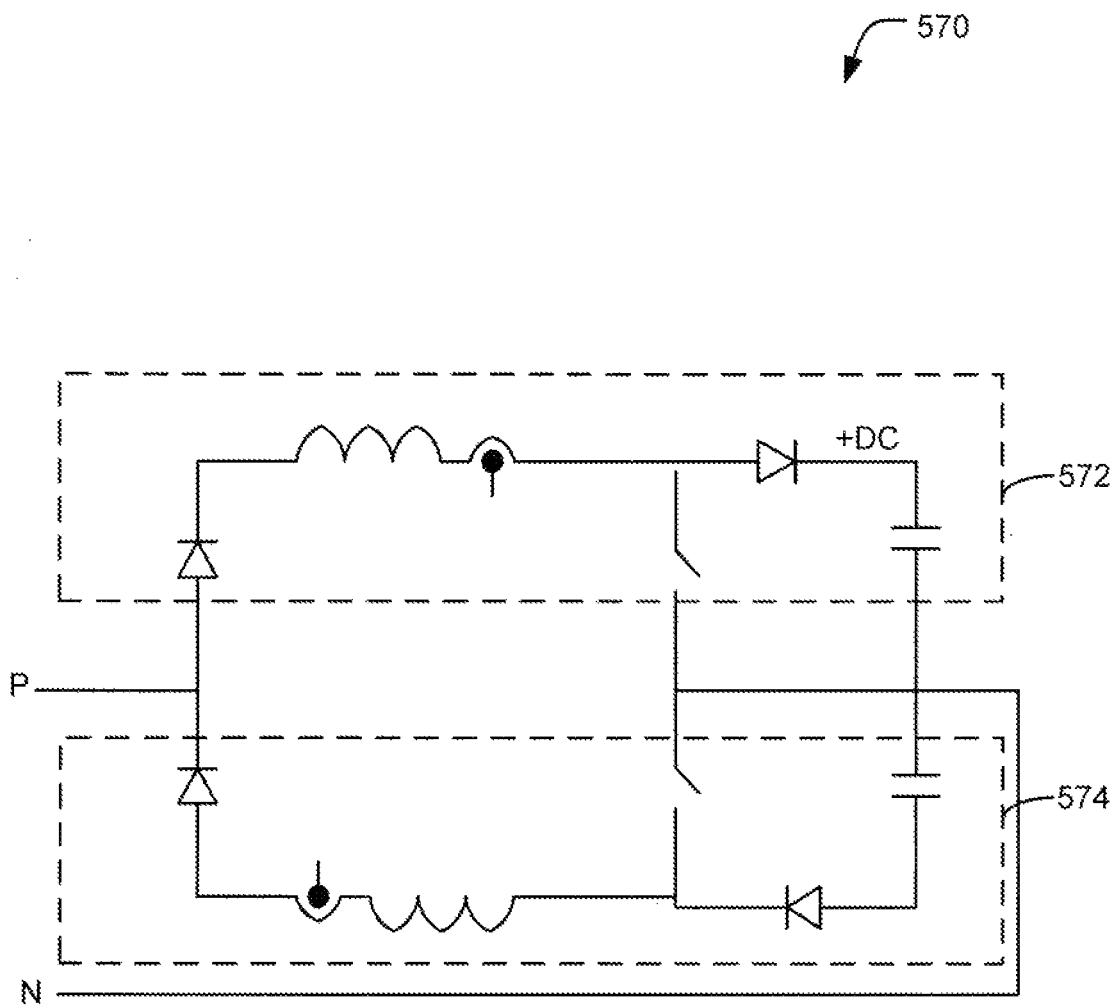
Figure 7:
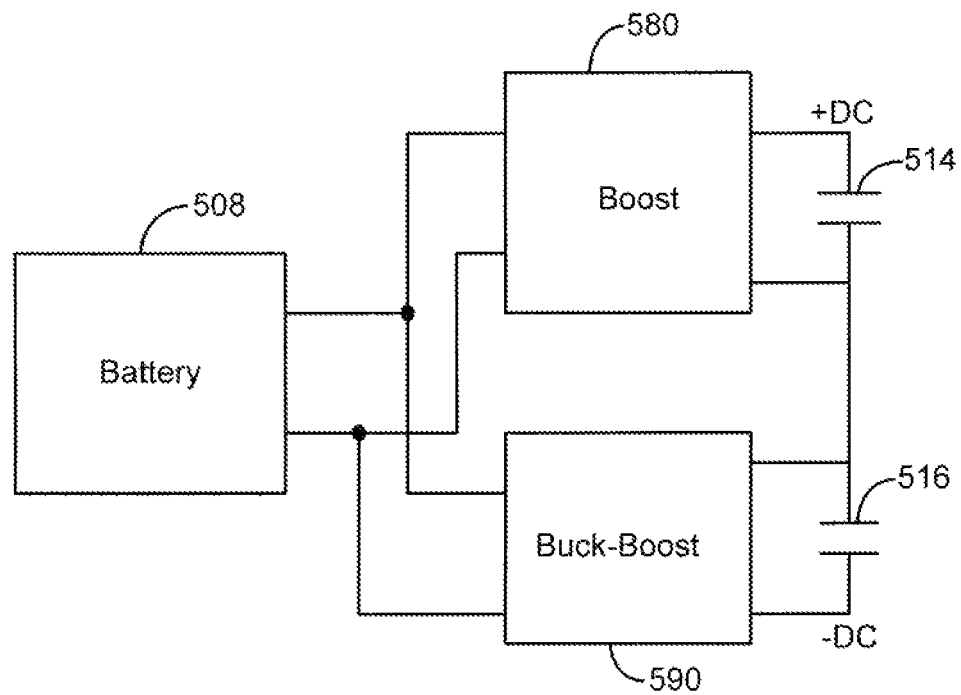
FIG. 7 is a circuit diagram of front-end converter operation in an on-battery mode of an online UPS.
Figure 8:
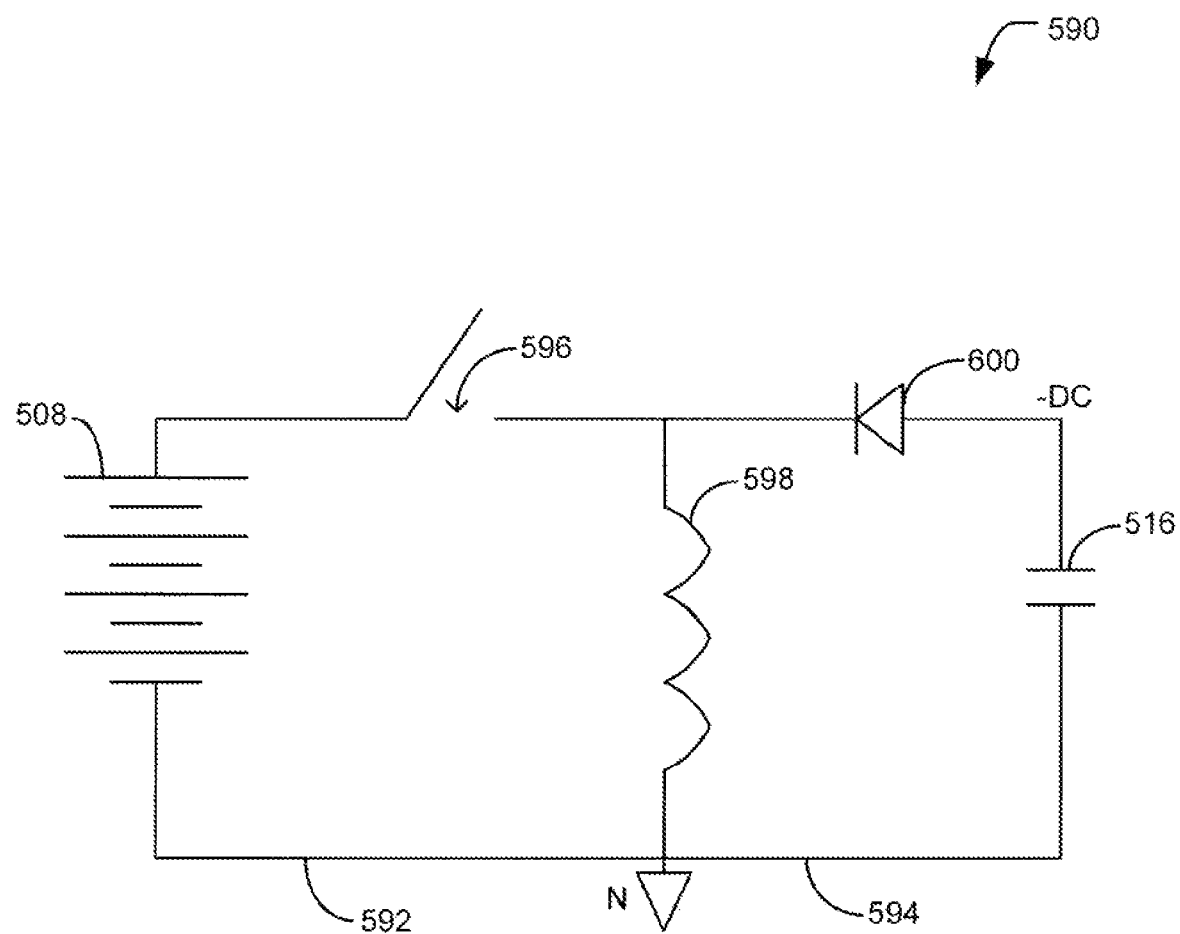
FIG. 8 is a circuit diagram of a typical buck-boost converter circuit.
Figure 9:
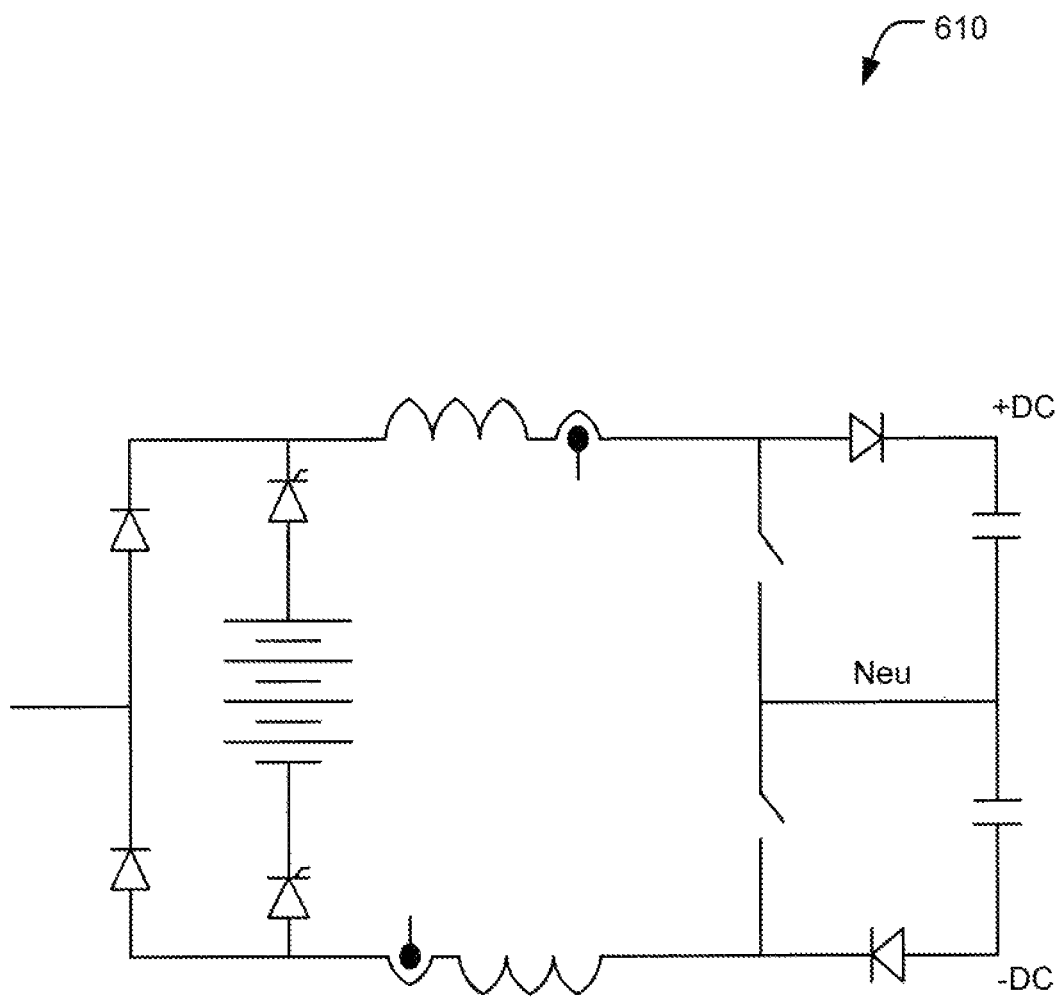
FIG. 9 is a circuit diagram of a twin boost topology.
Figure 10:
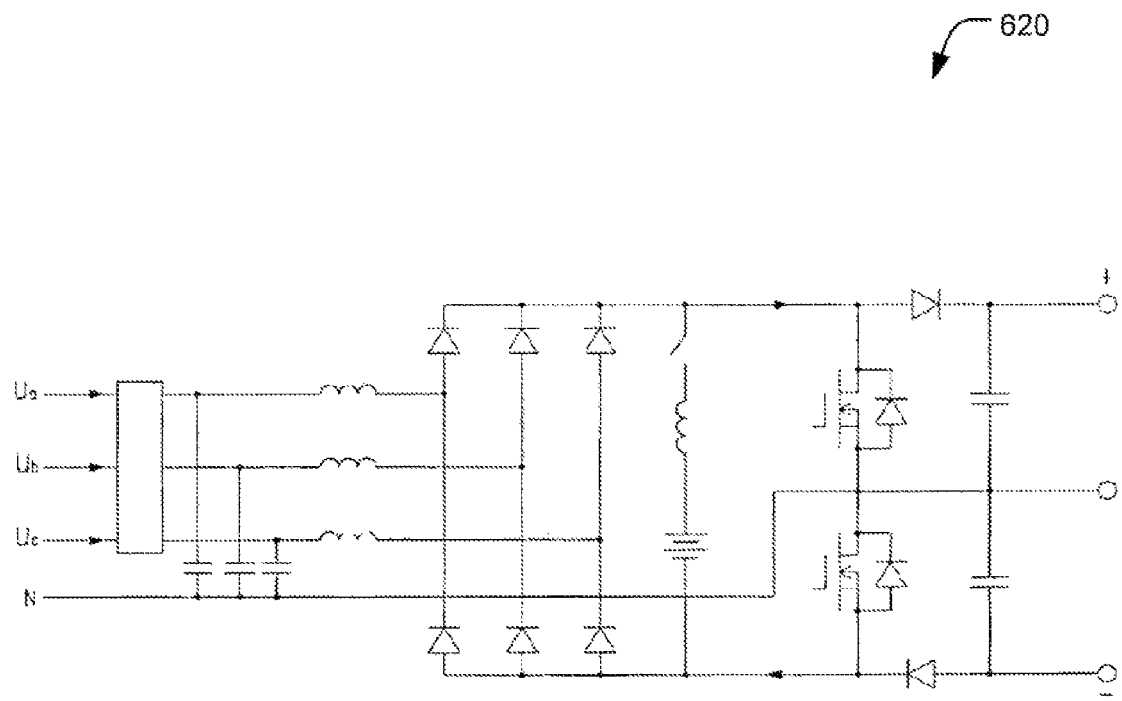
FIG. 10 is a circuit diagram of a three-phase front-end converter.
Figure 11:
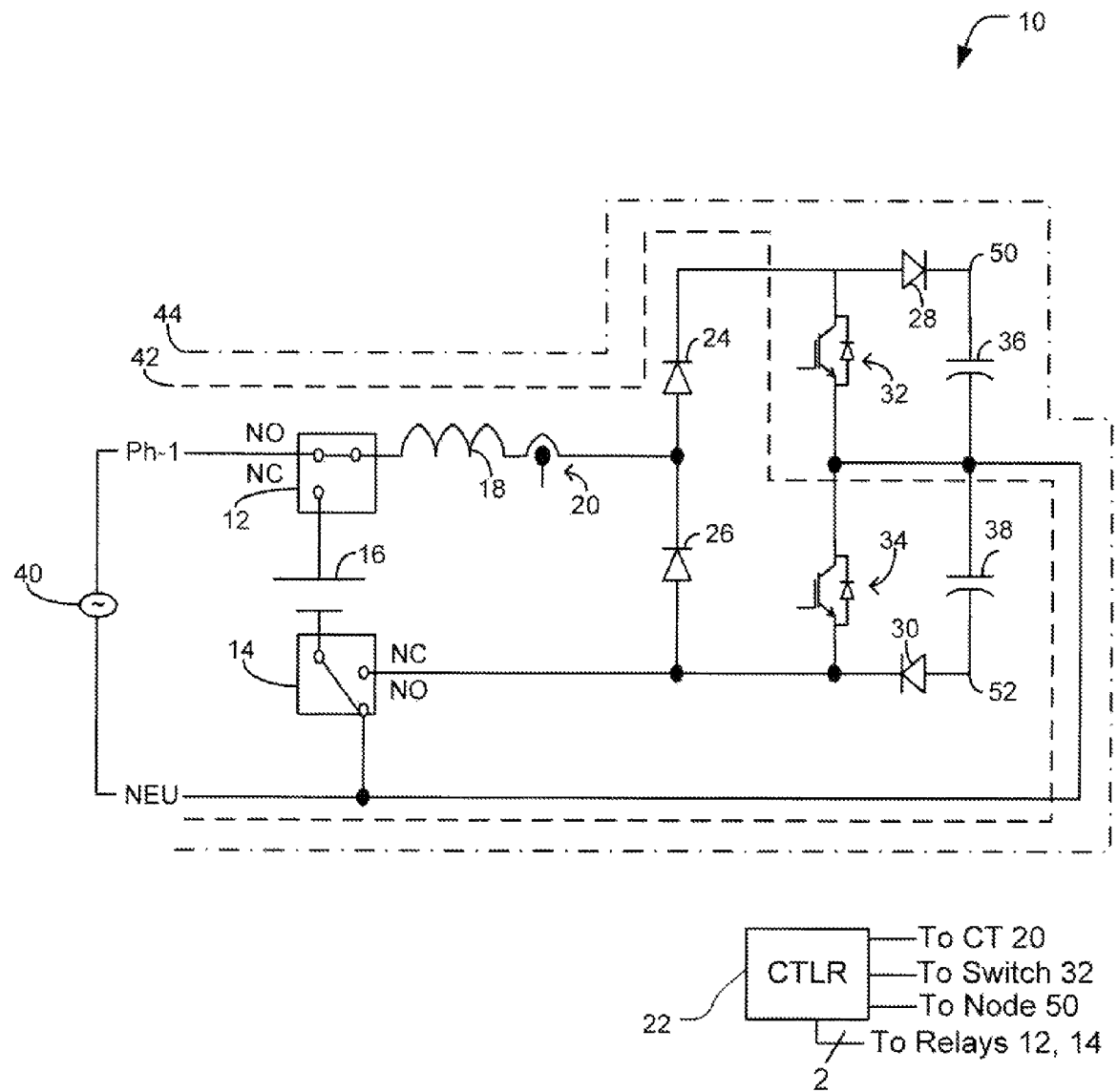
FIG. 11 is a circuit diagram of a shared-component front-end converter in an online mode during a positive half cycle of input voltage.

Referring to FIG. 11, a shared-component, single-phase, front-end converter 10 includes relays 12, 14, a battery 16, an inductor 18, a current transformer (CT) 20, a controller 22, diodes 24, 26, 28, 30, and switches 32, 34. The converter 10 is connected at its input to an AC power source 40 and at its output to positive and negative bus capacitors 36, 38, respectively. The converter 10 can operate from AC supply as well as the battery 16 (DC voltage) with a reduced number of components. The converter 10 is preferably, though not necessarily, designed to be a 230V system, i.e., the battery 16 provides 230VDC and the converter can be connected to a 230VAC source 40. The components of the converter 10 are preferably rated at about 600V or less. The converter 10 uses no SCRs, and as described below, the battery 16 is connected to neutral during online operation. The converter 10 is preferably connected to an inverter as shown in FIG. 1. Thus, an inverter and an output of the inverter is referred to below although not shown in FIG. 11.

The controller 22 is coupled and configured to monitor conditions and, affect states of components of the converter 10. The controller 22 is connected to the CT 20 to receive indications of the current through the CT. The controller 22 is also connected to nodes 50 and 52 to monitor DC voltages at the capacitors 36, 38. The controller 22 is also connected to the switches 32, 34 to control the switches 32, 34 to open (not conduct) or close (conduct) as desired. The controller 22 coordinates transitions between online and on-battery mode due to one or more relevant conditions, e.g., overvoltage of the AC source, blackouts, voltage spikes, return of AC source voltage to desired conditions, etc. Alternatively, the controller 22 may receive indications of transitions by a separate controller that coordinates the transitions, e.g., determines that a transition condition has occurred and instructs/initiates the transition.

The inductor 18 and the CT 20 are shared by both online, and on-battery modes. The relay 12 is coupled and configured to selectively connect the inductor 18 to either the AC source 40 or the positive terminal of the battery 16. The inductor 18 is connected through the CT 20 to positive and negative boost converters. The inductor 18 is the only inductor in the converter 10. Thus, the converter 10 includes only a single inductor. Here, a "single" inductor is a single inductance in the circuit location shown, but the inductance may be made up of multiple physical devices. The relay 14 is configured and coupled to selectively connect the battery's negative terminal to either neutral (connected to the AC source 40), or to the diode 26, the switch 34, and the diode 30.

In online mode, the relays 12, 14 are connected to normally-open (NO) positions and the front-end converter 10 works from input AC voltage from the AC source 40. During the positive half cycle of the input voltage, a positive boost converter portion comprising the inductor 18, the CT 20, the controller 22, the diodes 24, 28, and the switch 32 converts the input positive AC half-cycle voltage to a DC voltage and provides this voltage to the capacitor 36. During the positive half cycle, the controller 22 may open the boost switch 34 and monitors the voltage at the positive DC bus capacitor 36 and the current through the CT 20. Based on the monitored voltage and current, the controller 22 opens and closes the boost switch 32 to maintain the voltage at the capacitor 36 at about a desired level, e.g., within a desired voltage range. A line 42 shows the current path while the boost switch 32 is turned on (closed/conducting) and a line 44 shows the current path while the boost switch 32 is off (open/non-conducting).

Figure 12:
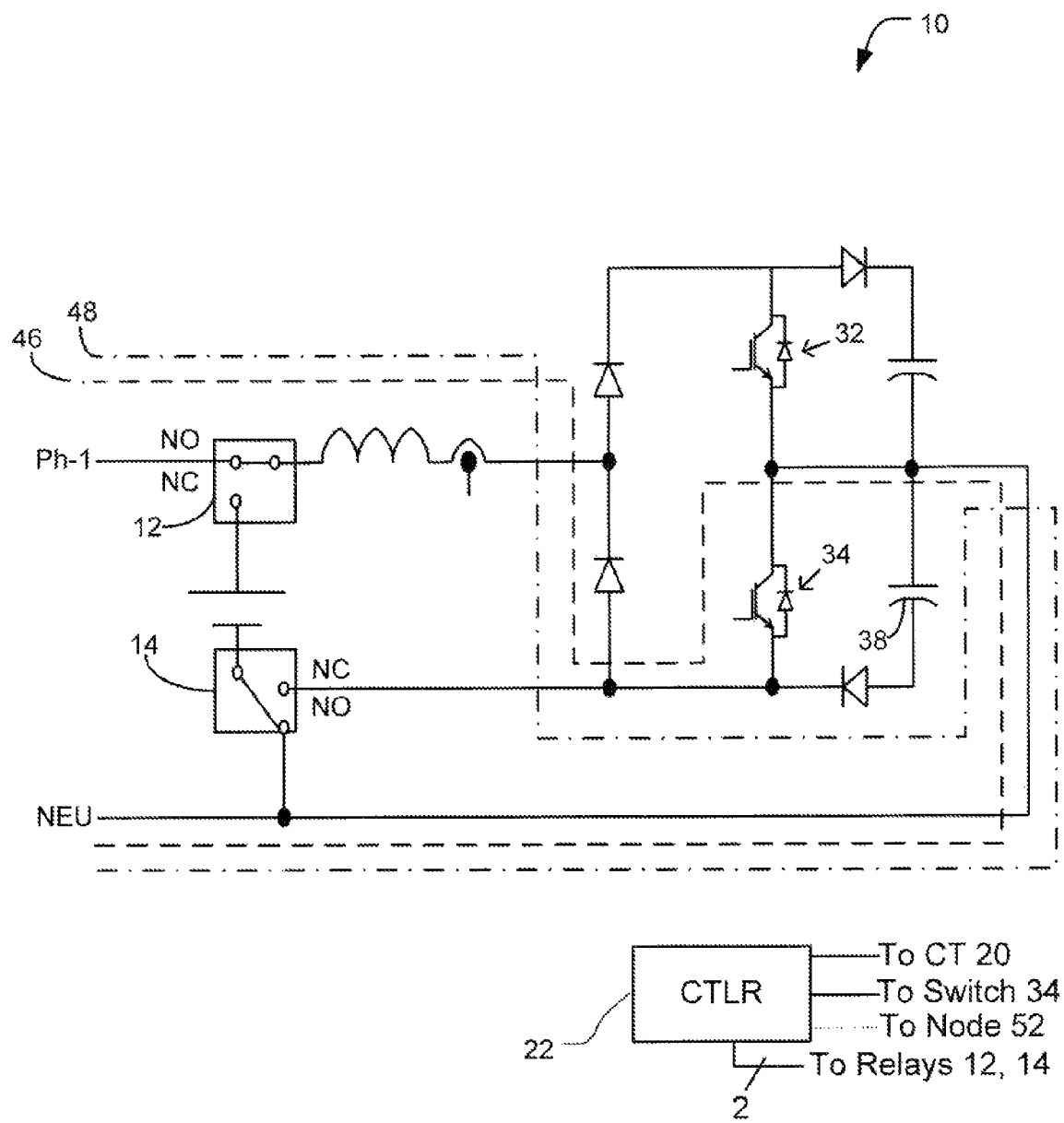
FIG. 12 is a circuit diagram of the shared-component front-end converter in the online mode during a negative half cycle of input voltage.

Referring to FIG. 12, during the negative half cycle, the controller 22 may open the boost switch 32 and monitors the voltage at the negative DC bus capacitor 38 and the current through the CT 20. Based on the monitored voltage and current, the controller 22 opens and closes the boost switch 34 to maintain the voltage at the capacitor 38 at about a desired level, e.g., within a desired voltage range. A line 46 shows the current path while the boost switch 34 is turned on (closed/conducting) and a line 48 shows the current path while the boost switch 34 is off (open/non-conducting).

During both the positive and negative half cycles of the source 40, the inductor 18 and the CT 20 carry current. Conversely, the diodes 24, 26, 28, 30, the switches 32, 34, and the capacitors 36, 38 each conduct current during only respective half cycles of the input voltage source 40.

Figure 13:
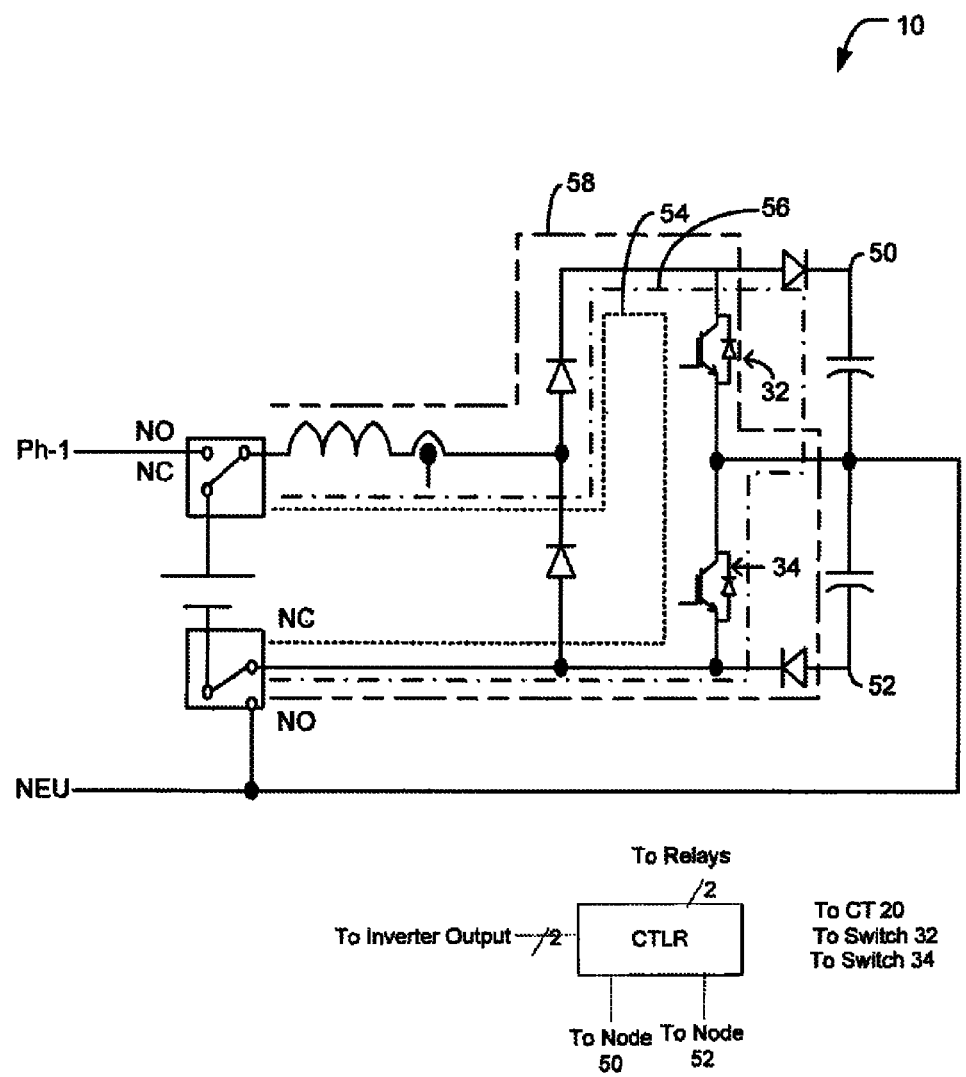
FIG. 13 is a circuit, diagram of the shared-component front-end converter in an on-battery mode.

Referring to FIG. 13, with further reference to FIG. 11, in the on-battery mode the relays 12, 14 are connected to their normally-closed (NC) positions and the front-end converter 10 works from the DC voltage of the battery 16 and is isolated from the AC voltage source 40. The controller 22 controls the front-end converter 10 during on-battery operation in sync with the output voltage of an inverter (not shown) connected to the converter 10 across nodes 50, 52, as opposed to being in sync with the input voltage during online operation. As described below, the switches 32, 34 are each closed completely for one half cycle of the output voltage and are opened and closed as desired in the other half cycle of the output voltage. Further, as discussed above and below, only the single inductor 18 is used in the converter 10 for both positive and negative half cycles of the input when the converter 10 is running in online mode, and for both positive and negative half cycles of the output voltage when the converter 10 is running in on-battery mode. Also, only the single current transformer 20 and the single controller 22 can be used to operate the converter 10 during both online and on-battery operation, as the relay 14 is configured and coupled to selectively connect the battery's negative terminal to either neutral or to the diode 26, the switch 34, and the diode 30.

During the positive half cycle of the output voltage, the controller 22 closes the switch 34 and opens and closes the switch 32 as desired. The controller 22 monitors the current through the CT 20 and the voltage at node 50, determines a pulse width modulation (PWM) rate using the monitored current and voltage, and opens and closes the switch 32 in accordance with the determined PWM rate to maintain the voltage at the node 50 at about a desired level, e.g., within a desired voltage range. As shown by a line 54, when the switch 32 is closed, current will flow though the battery 16, the relay 12, the inductor 18, the CT 20, the diode 24, the switch 32, the switch 34, and the relay 14. The current in the inductor 18 increases when the switch 32 is closed and energy is stored in the inductor 18. As shown by a line 56, when the switch 32 is open, current will flow through the battery 16, the relay 12, the inductor 18, the CT 20, the diode 24, the diode 28, the capacitor 36, the switch 34, and the relay 14. The inductor current decreases when the switch 32 is open because energy is taken from the inductor 18 and transferred to the capacitor 36, increasing the voltage across the capacitor 36, i.e., at the node 50.

During the negative half cycle of the output voltage, the controller 22 closes the switch 32 and opens and closes the switch 34 as desired. The controller 22 monitors the current through the CT 20 and the voltage at node 52, determines a PWM rate using the monitored current and voltage, and opens and closes the switch 34 in accordance with the determined PWM rate to maintain the voltage at the node 52 at about a desired level, e.g., within a desired voltage range. As shown by the line 54, when the switch 34 is closed, current will flow though the battery 16, the relay 12, the inductor 18, the CT 20, the diode 24, the switch 32, the switch 34, and the relay 14. The current in the inductor 18 increases when the switch 34 is closed and energy is stored in the inductor 18. As shown by a line 58, when the switch 34 is open, current will flow through the battery 16, the relay 12, the inductor 18, the CT 20, the diode 24, the switch 32, the capacitor 38, the diode 30, and the relay 14. The inductor current decreases when, the switch 34 is open because energy is taken from the inductor 18 and transferred to the capacitor 38, increasing the voltage across the capacitor 38, i.e., at the node 52.

Figure 14:
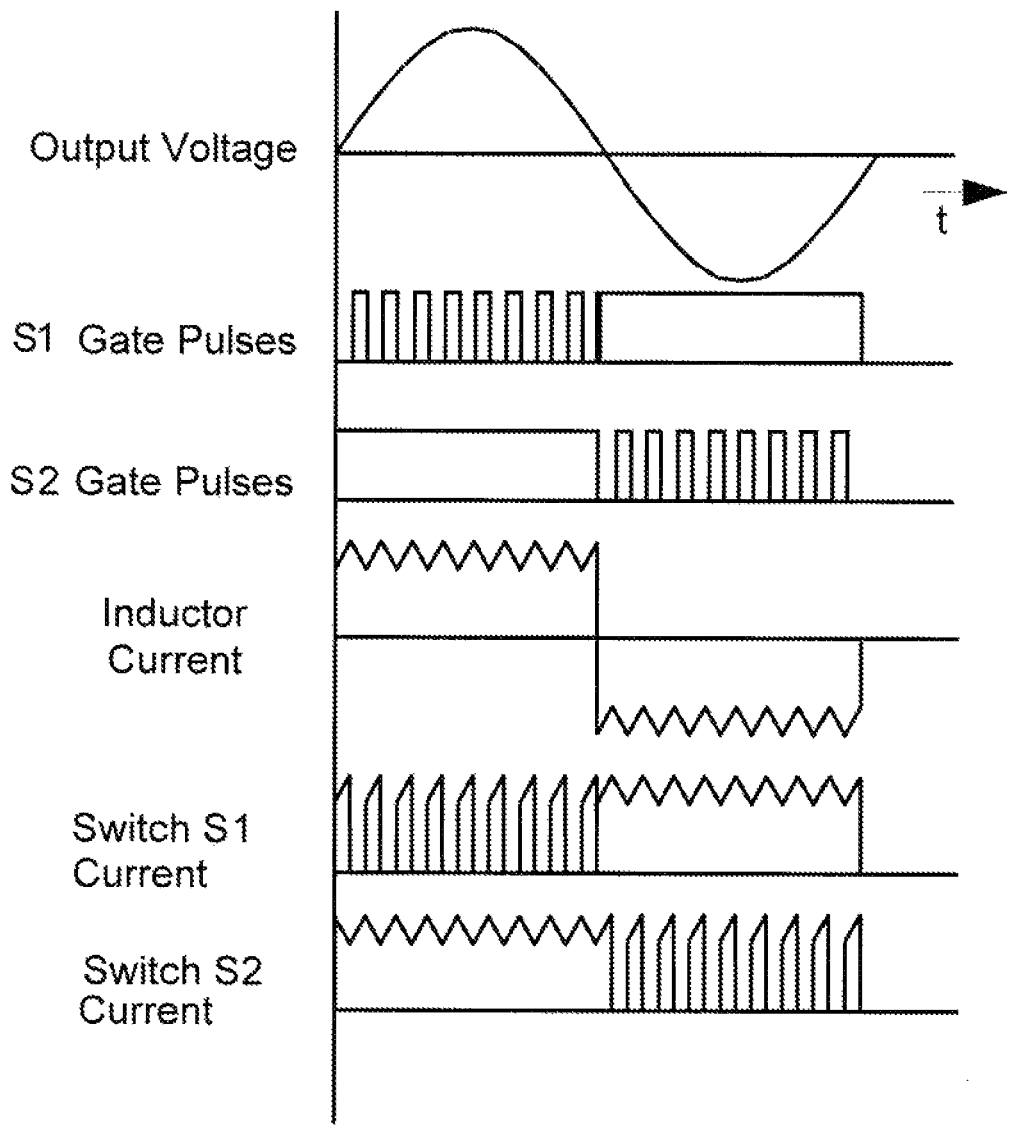
FIG. 14 is a time plot of switch states and currents relative to an output voltage cycle of the converter shown in FIG. 10 in the on-battery mode.

Operation of the converter 10 in on-battery mode is illustrated in FIG. 14. As shown, in the positive half cycle of the output voltage, the switch 34 is conducting and the switch 32 is opened and closed, yielding a non-zero fluctuating inductor current, a non-zero fluctuating current through the switch 34, and an intermittent current through the switch 32. Also as shown, the current in the switch 32 rises during the time that the switch 32 is closed. In the negative half cycle of the output voltage, the switch 32 is conducting and the switch 34 is opened and closed, yielding a non-zero fluctuating inductor current, a non-zero fluctuating current through the switch 32, and an intermittent current through the switch 34. As with the switch 32 in the positive half cycle, the current in the switch 34 rises during the time that the switch 34 is closed.

Figure 15:
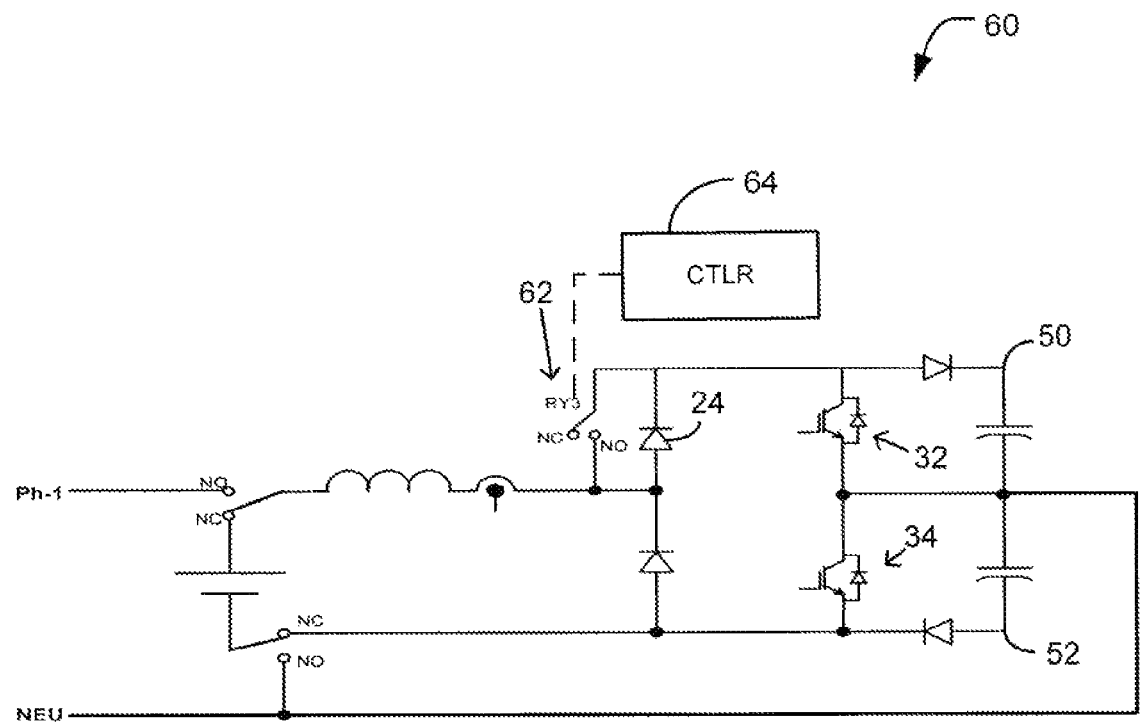
FIG. 15 is a circuit diagram of an alternative shared-component front-end converter in an online mode.

Other embodiments are within the scope and spirit of the appended claims. For example, referring to FIG. 15, a front-end converter 60 includes similar components to the components of the converter 10 shown in FIGS. 11-13. The converter 60, however, further includes a relay 62, and a controller 64 that is configured to monitor voltages and currents and control the switches 32, 34 similarly to the controller 22, but is also coupled to, and configured to control, the relay 62. The relay 62 is coupled across the diode 24 and configured to selectively bypass the diode 24, with the diode 24 being essentially short circuited when the relay 62 is closed (conducting). The relay 62 has lower loss than the diode 24, and may be so low as to be negligible compared to the loss in the diode 24. The controller 64 monitors the mode of the converter 60, i.e., whether the converter 60 is in online or on-battery mode. The controller 64 closes the relay 62 during on-battery mode and opens the relay 62 during online mode. As current flows through the diode 24 of the converter 10 during both (positive and negative) half cycles of the output voltage while in on-battery mode, the relay 62 is closed during on-battery mode to reduce energy loss and improve efficiency by running current through the relay 62 instead of the diode 24 during on-battery mode of the converter 60.

Three-Phase Circuitry

Figure 16:
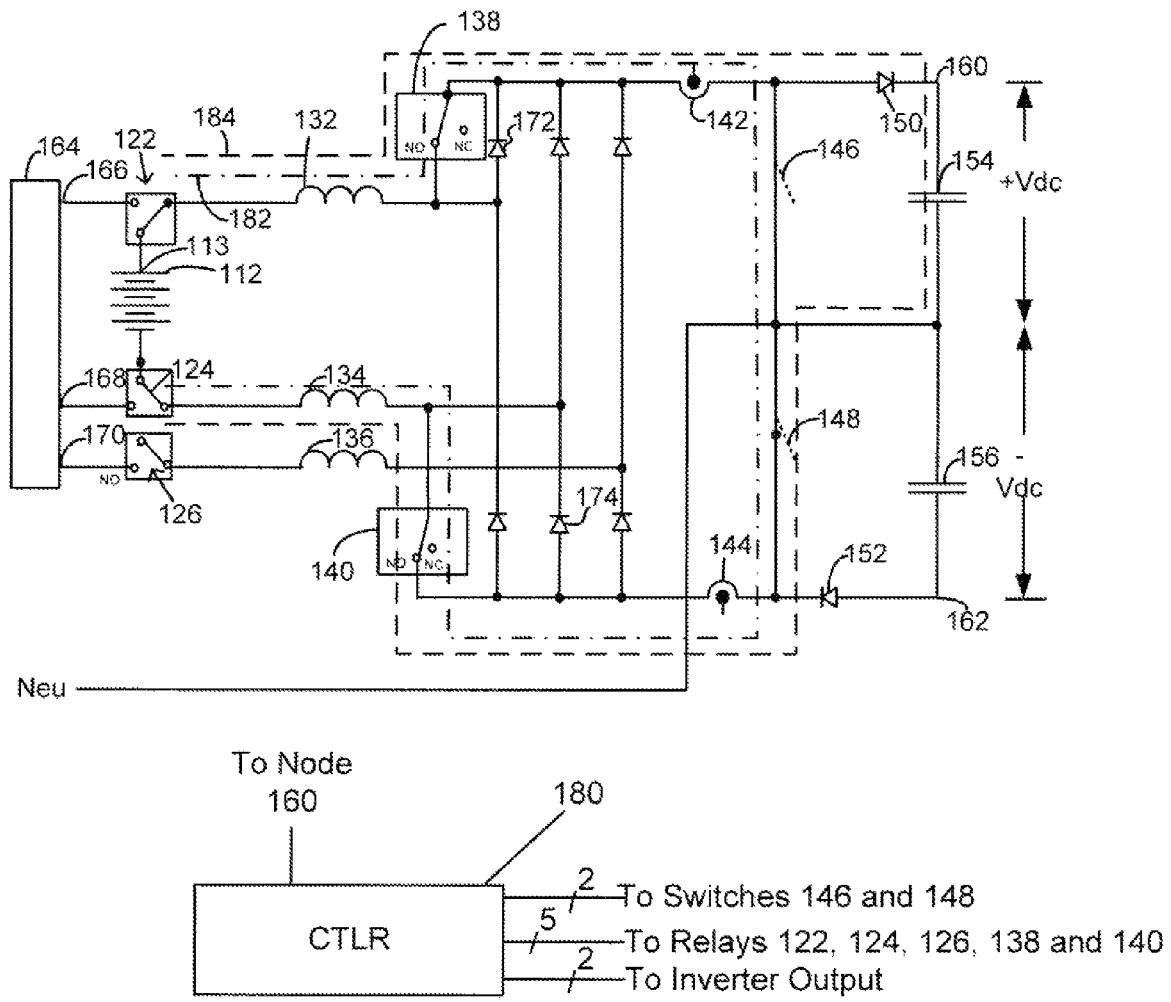
FIG. 16 is a circuit diagram of a shared-component three-phase front-end converter in an on-battery mode during a positive half cycle of an inverter output voltage.

Referring to FIG. 16, a three-phase, shared-component, front-end converter 110 is configured to use front-end inductors in an on-battery mode of operation. Compared to the three-phase front-end converter 620, the converter 110 has a battery 112 disposed upstream from a diode bridge 114 as opposed to downstream in the converter 620, and eliminates the inductor L, thus reducing the cost of the converter 110 compared to the converter 620. The converter 110 achieves online UPS front-end converter operation with only three inductors. The converter 110 is preferably connected to an inverter as shown in FIG. 1. Thus, an inverter and an output of the inverter is referred to below although, not shown in FIG. 16.

The converter 110 includes relays 122, 124, 126, inductors 132, 134, 136, relays 138, 140, CTs 142, 144, switches 146, 148, and diodes 150, 152. Bus capacitors 154, 156 are disposed between nodes 160, 162 corresponding to positive and negative DC buses, respectively. The relay 122 is disposed, coupled, and configured to selectively connect the inductor 132 to either the positive terminal 113 of the battery 112 or to a first phase input 166 of the converter 110 corresponding to a first phase output of a source 164. The relay 124 is disposed, coupled, and configured to selectively connect the inductor 134 to either the negative terminal 115 of the battery 112 or to a second phase input 168 of the converter 110 corresponding to a second phase output of the source 164. The relay 126 is disposed, coupled, and configured to selectively connect the inductor 136 to, or disconnect/decouple the inductor 136 from, a third phase input 170 of the converter 110 corresponding to a third phase output of the source 164. Each phase of the power from the source 164 is connected to the diode bridge 114 through a respective single inductor 132, 134, 136. The battery 112 is connected through the relays 122, 124 and the inductors 132, 134 to provide input power to the rectifying diode bridge 114. The relay 138 is coupled on one end between the inductor 132 and an anode of a diode 172 of the bridge 114 and on the other end to a cathode of the diode 172. The relay 138 is coupled and configured to selectively bypass and essentially short circuit the diode 172 in response to a signal from a controller 180. The relay 140 is coupled on one end between the inductor 134 and a cathode of a diode 174 of the bridge 114 and on the other end to an anode of the diode 174. The relay 140 is coupled and configured to selectively bypass and essentially short circuit the diode 174 in response to a signal from the controller 180.

The controller 180 is coupled and configured to monitor currents and voltages and controls states of the relays 122, 124, 126, 138, 140. The controller 180 is coupled to the CTs 142, 144 to monitor currents, is coupled to the inputs 166, 168, 170 to determine acceptability of input power, is coupled to the output of the inverter to monitor the output voltage, and is coupled to the relays 122, 124, 126, 138, 140 to provide control signals to set the state (open/closed) of the relays 122, 124, 126, 138, 140.

In response to determining that the input power is acceptable, the controller 180 sets the converter 110 to (or leaves the converter 110 in) the online condition. During online operation, the controller 180 sets the relays 122, 124, 126 to their NO positions connecting the source 164 to the inductors 132, 134, 136. Further, the controller 180 sets the relays 138, 140 to their NC (here open) positions such that current will flow through the diodes 172, 174 during positive and negative half cycles of the first and second source phases, respectively. The control of the converter 110 during the AC (online) operation is similar to the online operation described in U.S. Pat. No. 7,005,759 and the IEEE paper by Xu referenced above.

In response to determining that the input power is unacceptable, the controller 180 sets the converter 110 to (or leaves the converter 110 in) an on-battery mode. The controller 180 sends signals to the relays 122, 124, 126 to set the relays 122, 124, 126 to their NC positions. In their NC positions, the relays 122, 124 connect the positive and negative terminals of the battery 112 to the inductors 132, 134, respectively. In its NC position, the relay 126 isolates the inductor 136 from the input 170 and from the battery 112. Also in response to determining that the input power is unacceptable, the controller 180 sends signals to set the relays 138, 140 to their NO (here conducting) positions, respectively. In its NO position, the relay 172 bypasses, essentially short circuiting, the diode 172 to effectively directly connect the inductor 132 to the CT 142 with current flowing through the relay 138. In its NO position, the relay 140 bypasses, essentially short circuiting the diode 174 to effectively directly connect the inductor 134 to the CT 144 with current flowing through the relay 140.

The controller 180 monitors the output voltage of the inverter, the voltages at the nodes 160, 162, and the current through the CTs 142, 144, and controls the switches 146, 148 to achieve desired voltages at the nodes 160, 162. In response to determining that the output voltage of the inverter is in its positive half cycle, the controller 180 sends a signal to the switch 148 to close, as shown in FIG. 16. In response to determining that the output voltage of the inverter is in, its negative half cycle, the controller 180 sends a signal to the switch 146 to close, as shown, in FIG. 17.

Referring to FIG. 16, during the positive half cycle of the inverter output voltage, the controller 180 regulates opening and closing of the switch 146. The controller 180 monitors the current through the CT 142 and the voltage at node 160, determines a PWM rate using the monitored current and voltage, and opens and closes the switch 146 in accordance with the determined PWM rate to maintain the voltage at the node 160 at about a desired level, e.g., within a desired voltage range. As shown by a line 182, when the switch 146 is closed, current will flow through the battery 112, the relay 122, the inductor 132, the relay 138, the CT 142, the switch 146, the switch 148, the CT 144, the relay 140, and the inductor 134. The current in the inductors 132, 134 increases when the switch 146 is closed and energy is stored in the inductors 132, 134. As shown by a line 184, when the switch 146 is open, current will flow through the battery 112, the relay 122, the inductor 132, the relay 138, the CT 142, the diode 150, the capacitor 154, the switch 148, the CT 144, the relay 140, and the inductor 134. With the switch 146 open, energy is transferred from the battery 112 to the bus capacitor 154, increasing the voltage across the capacitor 154, i.e., at the node 160.

Figure 17:
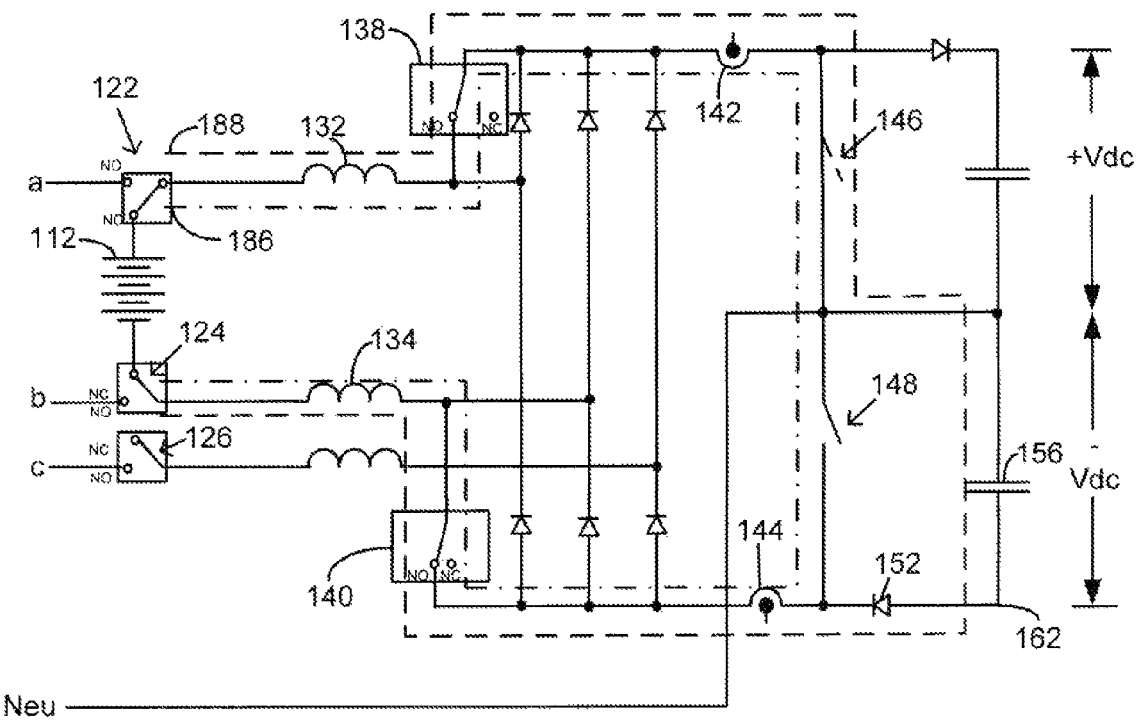
FIG. 17 is a circuit diagram of the shared-component three-phase front-end converter shown in FIG. 16 in the on-battery mode during a negative half cycle of the inverter output voltage.
Figure 17:
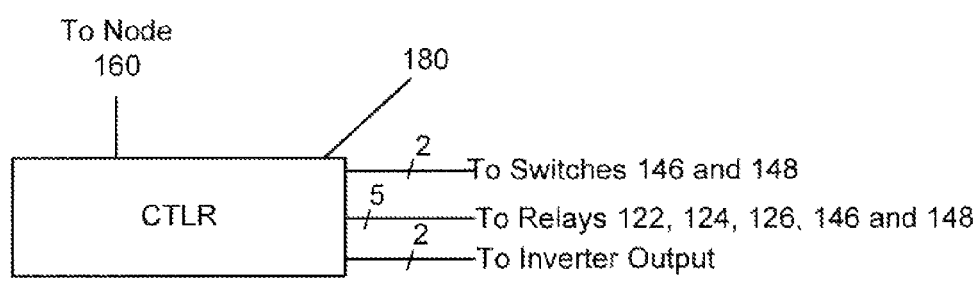

Referring to FIG. 17, with further reference to FIG. 16, during the negative half cycle of the inverter output voltage, the controller 180 regulates opening and closing of the switch 148. The controller 180 monitors the current through the CT 144 (and/or the CT 142) and the voltage at node 162, determines a PWM rate using the monitored current and voltage, and opens and closes the switch 148 in accordance with the determined PWM rate to maintain the voltage at the node 162 at about a desired level, e.g., within a desired voltage range. As shown by a line 186, when the switch 146 is closed, current will flow through the battery 112, the relay 122, the inductor 132, the relay 138, the CT 142, the switch 146, the switch 148, the CT 144, the relay 140, and the inductor 134. The current in the inductors 132, 134 increases when the switch 148 is closed and energy is stored in the inductors 132, 134. As shown by a line 188, when the switch 148 is open, current will flow through the battery 112, the relay 122, the inductor 132, the relay 138, the CT 142, the switch 146, the capacitor 156, the diode 152, the CT 144, the relay 140, and the inductor 134. With the switch 148 open, energy is transferred from the battery 112 to the bus capacitor 156, increasing the voltage across the capacitor 156, i.e., at the node 162. This operation is similar to using twin boost converters with floating battery as explained above with reference to single-phase front-end converter operation.

Figure 18:
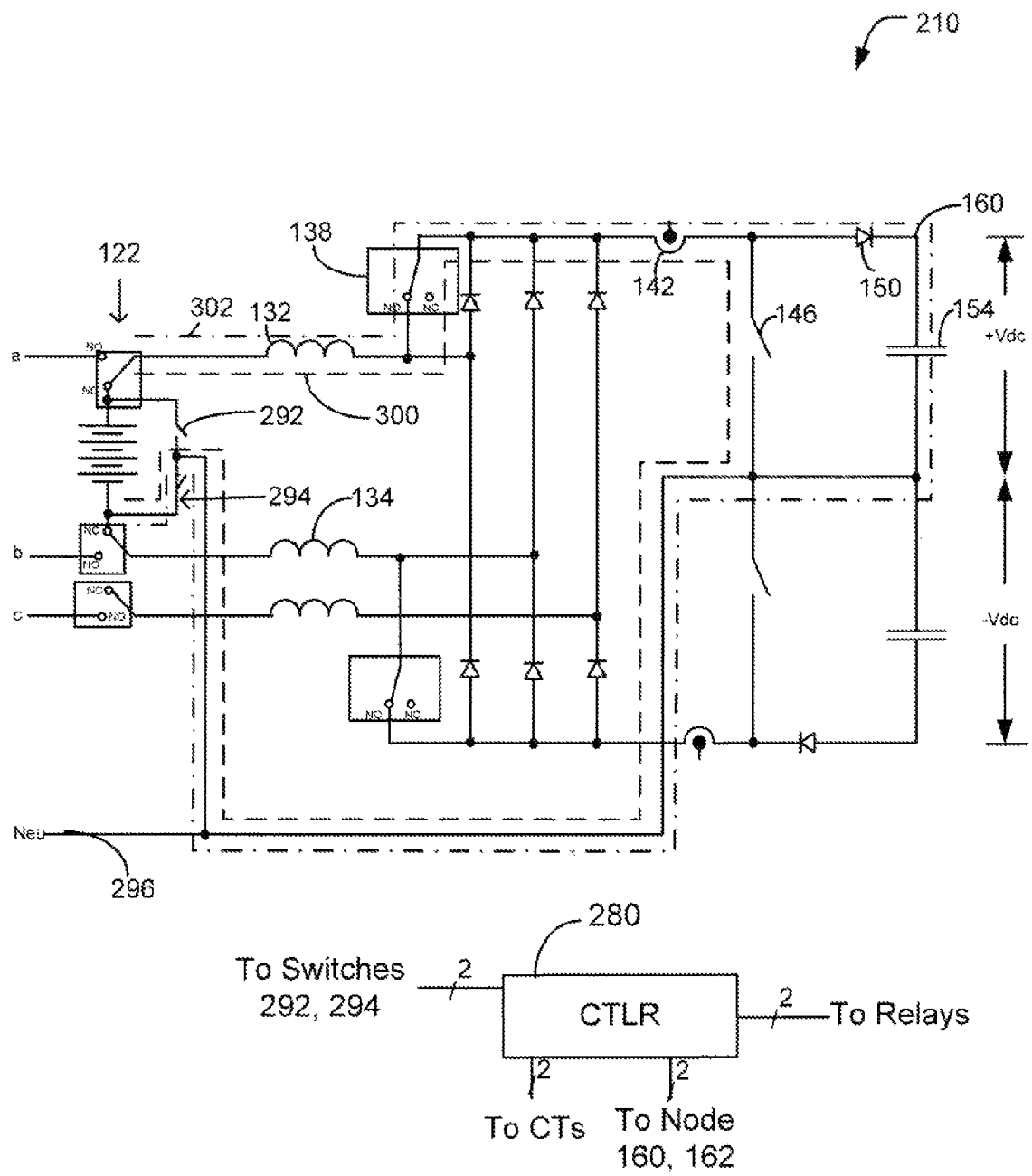
FIG. 18 is an alternative circuit diagram of a shared-component three-phase front-end converter in an on-battery mode during a positive half cycle of an inverter output voltage.
Figure 19:
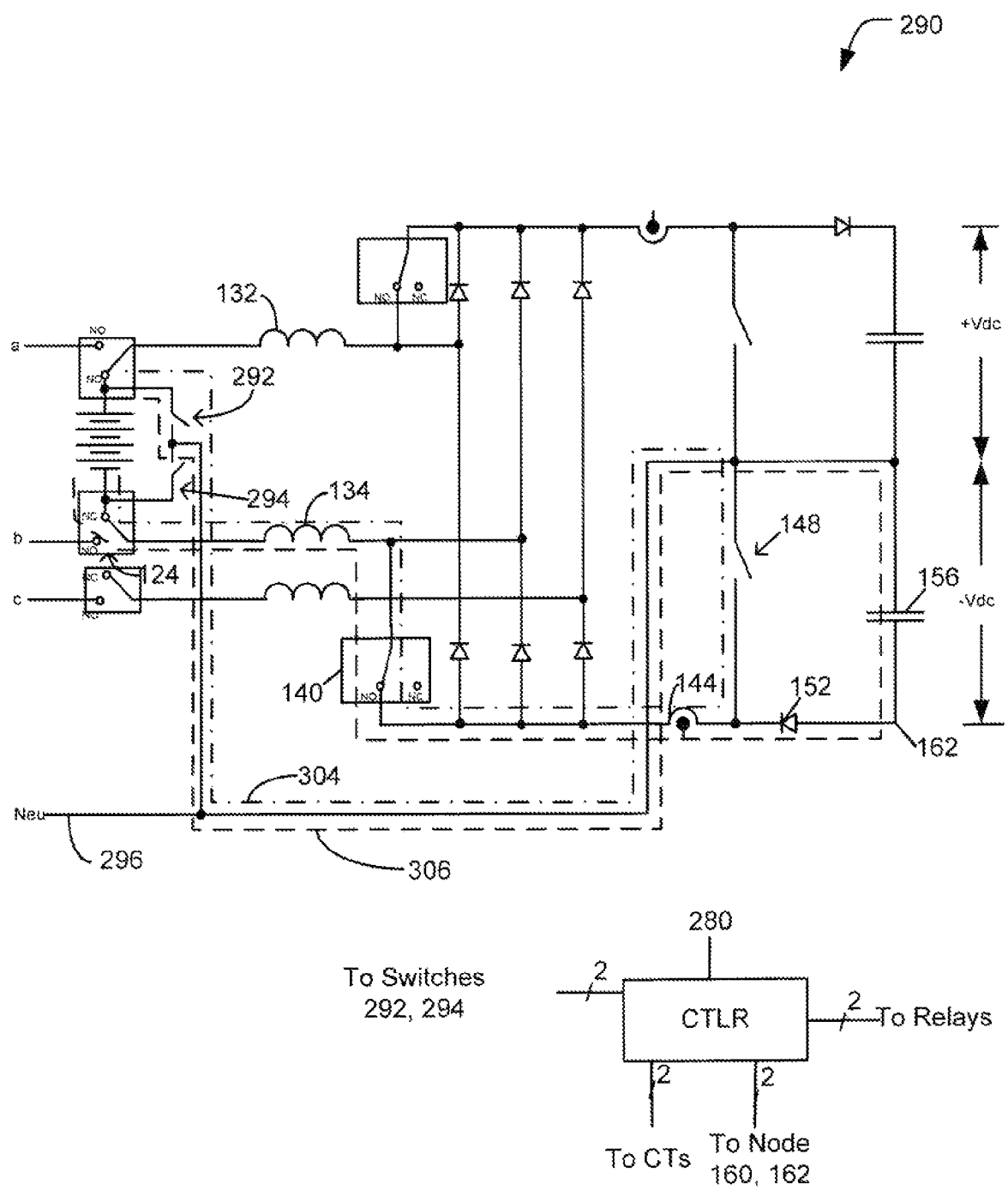
FIG. 19 is a circuit diagram of the shared-component three-phase front-end converter shown in FIG. 18 in the on-battery mode during a negative half cycle of the inverter output voltage.

Other embodiments of three-phase converters may be used. For example, referring to FIG. 18, a converter 210 is configured similarly to the converter 110 except that two relays 292, 294 are provided. The relay 292 is connected to the positive terminal of the battery 112 and selectively connects to a neutral line 296 or to an open circuit. The relay 294 is connected to the negative terminal of the battery 112 and selectively connects to the neutral line 296 or to an open circuit. The switches 292, 294 can be low voltage FETs rated for battery voltage, e.g., 230V. A controller 280 is configured to control states of the switches 292, 294 in addition to being configured with much of the functionality of the controller 180 described above. Operation of the converter 210 in an online mode is similar to that described in U.S. Pat. No. 7,005,759 and the IEEE paper by Xu referenced above. As with the converter 110, the converter 210 is preferably connected to an inverter via the nodes 160, 162, similarly to as shown in FIG. 1, and thus the inverter and its output are referenced below but not shown in FIG. 18. The controller 280 monitors the output voltage of the inverter, the voltages at the nodes 160, 162, and the current through the CTs 142, 144, and controls the switches 146, 148, 292, 294 to achieve desired voltages at the nodes 160, 162. In response to determining that the output voltage of the inverter is in its positive half cycle, the controller 280 sends a signal to the switch 294 to close, as shown in FIG. 18. As with the switch 148 in the converter 110, the switch 294 will remain closed during the positive half cycle. The controller 280 also sends signals to the switches 292, 148 to open, and these switches will remain open during the positive half cycle. In response to determining that the output voltage of the inverter is in its negative half cycle, the controller 280 sends a signal to the switch 292 to close, as shown in FIG. 19. As with the switch 146 in the converter 110, the switch 292 will remain closed during the negative half cycle. The controller 280 also sends signals to the switches 294, 146 to open, and these switches will remain open during the negative half cycle.

During the positive half cycle of the inverter output voltage, the controller 280 regulates opening and closing of the switch 146. The controller 280 monitors the current through the CT 142 and the voltage at node 160, determines a PWM rate using the monitored current and voltage, and opens and closes the switch 146 in accordance with the determined PWM rate to maintain the voltage at the node 160 at about a desired level, e.g., within a desired voltage range. As shown by a line 300, when the switch 146 is closed, current will flow through the battery 112, the relay 122, the inductor 132, the relay 138, the CT 142, the switch 146, the neutral line 296, and the switch 294. The current in the inductor 132 increases when the switch 146 is closed and energy is stored in the inductor 132. As shown by a line 302, when the switch 146 is open, current will flow through the battery 112, the relay 122, the inductor 132, the relay 138, the CT 142, the diode 150, the capacitor 154, the neutral line 296, and the switch 294. With the switch 146 open, energy is transferred from the battery 112 to the bus capacitor 154, increasing the voltage across the capacitor 154, i.e., at the node 160.

Referring to FIG. 19, during the negative half cycle of the inverter output voltage, the controller 280 regulates opening and closing of the switch 148. The controller 280 monitors the current through the CT 144 and the voltage at node 162, determines a PWM rate using the monitored current and voltage, and opens and closes the switch 148 in accordance with the determined PWM rate to maintain the voltage at the node 162 at about a desired level, e.g., within a desired voltage range. As shown by a line 304, when the switch 148 is closed, current will flow through the battery 112, the switch 292, the neutral line 296, the switch 148, the CT 144, the relay 140, the inductor 134, and the relay 124. The current in the inductor 134 increases when the switch 148 is closed and energy is stored in the inductor 134. As shown by a line 306, when the switch 148 is open, current will flow through the battery 112, the switch 292, the neutral line 296, the capacitor 156, the diode 152, the CT 144, the relay 140, the inductor 134, and the relay 124. With the switch 148 open, energy is transferred from the battery 112 to the bus capacitor 156, increasing the voltage across the capacitor 156, i.e., at the node 162.

What is claimed is:

1. In an uninterruptible power supply (UPS) system, a front-end converter comprising:
   a boost circuit having
      first and second inputs;
      a positive output node, a negative output node, and a neutral output node;
      and first and second switches,
      the boost circuit including directional circuit components comprising
         first and second output diodes and
         first and second input diodes, with an anode of the first input diode and a cathode of the second input diode connected to the first input of the boost circuit and an anode of the second input diode connected to the second input of the boost circuit,
      wherein the directional circuit components are configured to rectify incoming alternating-current (AC) power to provide a positive voltage across a positive capacitor coupled between the positive output node and the neutral output node and to provide a negative voltage across a negative capacitor coupled between the negative output node and the neutral output node wherein the first and second inputs are each directly connected to at least one of the directional circuit components; and
      wherein an anode of the first output diode is connected to a cathode of the first input diode, a cathode of the second output diode is connected to the anode of the second input diode, the first switch is connected on one end between the first input diode and the first output diode and on another end to a neutral connection, and the second switch is connected on one end between the second output diode and the second input diode and on another end to the neutral connection;
   a single inductor coupled to the first input of the boost circuit;
   a first AC input and a neutral AC input together configured to receive alternating-current power;
   a battery having a negative port and a positive port;
   a first device coupled, disposed, and configured to selectively couple the single inductor to one of the first AC input or the positive port of the battery;

a second device coupled, disposed, and configured to selectively couple the negative port of the battery to the second input of the boost circuit;
a third device coupled to the anode of the first input diode and the cathode of the first input diode and configured to selectively bypass the first input diode; and
a first controller coupled to the third device and configured to cause the third device to close to bypass the first input diode during an on-battery mode and to open during an online mode,
wherein the single inductor is shared between the online mode of the converter and the on-battery mode of the converter and the battery is coupled through the single inductor to the first input of the boost circuit during the on-battery mode; and
wherein the single inductor is an only inductor coupling the battery to the boost circuit.

2. The converter of claim 1 further comprising a single current transformer coupled in series with the single inductor between the first device and the first input of the boost circuit.

3. The converter of claim 2 comprising a second controller coupled to the single current transformer, the positive output node, the negative output node, and the first and second switches, the second controller being configured to couple to an output of an inverter to be coupled to the positive and negative output nodes, wherein the second controller is configured to:
cause, during a positive half cycle of a voltage at the output of the inverter, the second switch to close and the first switch to open and close in order to maintain a voltage at the positive output node within a first desired range; and
cause, during a negative half cycle of a voltage at the output of the inverter, the first switch to close and the second switch to open and close in order to maintain a voltage at the negative output node within a second desired range.

4. The converter of claim 1 further comprising a second controller coupled to the first and second devices and configured to:
cause the first device to couple the single inductor to the AC input during the online mode of the converter and to couple the single inductor to the positive port of the battery during the on-battery mode of the converter; and
cause the second device to couple the negative port of the battery to the neutral output node during the online mode of the converter and to couple the negative port of the battery to the second input of the boost circuit during the on-battery mode of the converter.

5. The converter of claim 1 wherein the second device is configured to selectively couple the negative port of the battery to one of the second input of the boost circuit or to the negative output node.

6. The converter of claim 1 wherein the first and second devices are relays.

7. The converter of claim 1 comprising:
a DC-AC inverter coupled to the positive output node, the negative output node, and the neutral output node, and including a positive DC inverter output and a neutral DC inverter output.

8. In an uninterruptible power supply (UPS) system, a front-end converter comprising:
a boost circuit having first and second inputs, a positive output node, a negative output node, and a neutral output node, the boost circuit configured to rectify incoming alternating-current (AC) power to provide a positive voltage across a positive capacitor coupled between the positive output node and the neutral output node and to provide a negative voltage across a negative capacitor coupled between the negative output node and the neutral output node;
a first inductor coupled to the first input of the boost circuit;
a first AC input and a neutral AC input together configured to receive alternating-current power;
a battery having a negative port and a positive port;
a first device coupled, disposed, and configured to selectively couple the first single inductor to one of the first AC input or the positive port of the battery; and
a second device coupled, disposed, and configured to selectively couple the negative port of the battery to the second input of the boost circuit;
wherein the first inductor is shared between an online mode of the converter and an on-battery mode of the converter and the battery is coupled through the first inductor to the first input of the boost circuit during the on-battery mode and further wherein the first AC input is configured to couple to a first phase port of a three-phase AC source, the front-end converter further comprising:
a second AC input configured to couple to a second phase port of the three-phase AC source;
a third AC input configured to couple to a third phase port of the three-phase AC source;
a second inductor coupled between the second device and the second input of the boost circuit, the second device being configured to selectively couple the second single inductor to one of the negative port of the battery or to the second AC input;
a fourth device; and
a third inductor coupled between the fourth device and a third input of the boost circuit, the fourth device being configured to selectively couple the third inductor to the third AC input.

9. The converter of claim 8 wherein the boost circuit comprises:
first and second input diodes, with, an anode of the first input diode and a cathode of the second input diode connected to the first input of the boost circuit and an anode of the second input diode connected to the neutral AC input;
third and fourth input diodes, with an anode of the third input diode and a cathode of the fourth input diode connected to the second input of the boost circuit and an anode of the fourth input diode connected to the neutral AC input; and
fifth and sixth input diodes, with an anode of the fifth input diode and a cathode of the sixth input diode connected to the third input of the boost circuit and an anode of the sixth input diode connected to the neutral AC input;
the converter further comprising:
a fifth device coupled to an anode of the fourth input diode and a cathode of the fourth input diode and configured to selectively bypass the fourth input diode; and
a controller coupled to the fifth device and configured to cause the fifth device to close to bypass the fourth input diode during the on-battery mode and to open during the online mode.

10. The converter of claim 9 further comprising a third device coupled to the anode of the first input diode and a cathode of the first input diode and configured to selectively bypass the first input diode, the controller being coupled to the third device and configured to cause the third device to close to bypass the first input diode during the on-battery mode and to open during the online mode.

11. The converter of claim 8 wherein the boost circuit comprises:

first and second input diodes, with an anode of the first input diode and a cathode of the second input diode connected to the first input of the boost circuit and an anode of the second input diode connected to the neutral AC input;

third and fourth input diodes, with an anode of the third input diode and a cathode of the fourth input diode connected to the second input of the boost circuit and an anode of the fourth input diode connected to the neutral AC input; and fifth and sixth input diodes, with an anode of the fifth input diode and a cathode of the sixth input diode connected to the third input of the boost circuit and an anode of the sixth input diode connected to the neutral AC input;

the converter further comprising:

a first current transformer coupled between cathodes of the first, third, and fifth input diodes and an anode of a positive output diode of the boost circuit; and a second current transformer coupled between anodes of the second, fourth, and sixth input diodes and a cathode of a negative output diode of the boost circuit.

12. The converter of claim 8 further comprising:

a positive half cycle battery switch coupled, disposed, and configured to selectively couple the positive port of the battery to the neutral output node;

a negative half cycle battery switch coupled, disposed, and configured to selectively couple the negative port of the battery to the neutral output node; and a controller coupled to the positive and negative half cycle battery switches and configured to cause the positive half cycle switch to be open, isolating the positive port of the battery from the neutral output node, and the negative half cycle switch to be closed, coupling the negative port of the battery to the neutral output node, during a positive half cycle of an inverter output voltage, and to cause the positive half cycle switch to be closed, coupling the positive port of the battery to the neutral output node, and the negative half cycle switch to be open, isolating the negative port of the battery from the neutral output node, during a negative half cycle of the inverter output voltage.

13. An uninterruptible power supply (UPS) comprising:

a DC-DC front-end converter including:
  a plurality of converter inputs configured to be coupled to a three phase AC power source;
  a positive DC front-end output;
  a negative DC front-end output; and
  a neutral front-end output;

a positive capacitor coupled between the positive DC front-end output and the neutral front-end output;

a negative capacitor coupled between the negative DC front-end output and the neutral front-end output; and a DC-AC inverter coupled to the positive DC front-end output, the negative DC front-end output, and the neutral front-end output, and including a positive DC inverter output and a neutral DC inverter output;

the DC-DC front-end converter further including:
  a boost circuit;
  a battery;
  a single first inductor coupled between a first input of the boost circuit and a first device configured to selectively couple the single first inductor to a positive port of the battery or to a first of the converter inputs;
  a single second inductor coupled between a second input of the boost circuit and a second device configured to selectively couple the single second inductor to a negative port of the battery or to a second of the converter inputs; and
  a single third inductor coupled between a third input of the boost circuit and a third device configured to selectively couple the single third inductor to a third of the converter inputs.

14. The UPS of claim 13 wherein the converter further includes fourth and fifth devices configured to bypass first and second input diodes during an on-battery mode of the converter.

15. The UPS of claim 14 wherein the converter further includes:

a sixth device configured to selectively couple the positive port of the battery to a neutral node of the converter; and a seventh device configured to selectively couple the negative port of the battery to the neutral node of the converter.

16. The UPS of claim 15 wherein the converter further includes a controller coupled to the fourth, fifth, sixth, and seventh devices and configured to cause:

the fourth and fifth devices to be closed, bypassing the first and second input devices, during the on-battery mode of the converter;

the sixth device to be open, isolating the positive port of the battery from the neutral node, and the seventh device to be closed, connecting the negative port of the battery to the neutral node, during a positive half cycle of an output voltage of the inverter; and the sixth device to be closed, connecting the positive port of the battery to the neutral node, and the seventh device to be open, isolating the negative port of the battery from the neutral node, during a negative half cycle of the output voltage of the inverter.

* * * * *